United States Patent
Hill et al.

(10) Patent No.: US 11,671,893 B2
(45) Date of Patent: *Jun. 6, 2023

(54) SECURE NETWORK ROLLOVER

(71) Applicant: Oceus Networks, LLC, Reston, VA (US)

(72) Inventors: Chris Hill, Plano, TX (US); Terrance Scott Porter, Frisco, TX (US); James Thomas Row, II, Plano, TX (US); Brad Peacher, The Colony, TX (US)

(73) Assignee: Oceus Networks, LLC, Reston, VA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/101,418

(22) Filed: Nov. 23, 2020

(65) Prior Publication Data

US 2021/0153093 A1 May 20, 2021

Related U.S. Application Data

(63) Continuation of application No. 15/625,735, filed on Jun. 16, 2017, now Pat. No. 10,873,891.
(Continued)

(51) Int. Cl.
*H04W 36/32* (2009.01)
*H04L 12/46* (2006.01)
(Continued)

(52) U.S. Cl.
CPC ......... *H04W 36/32* (2013.01); *H04L 12/4633* (2013.01); *H04L 12/4679* (2013.01);
(Continued)

(58) Field of Classification Search
CPC . H04W 36/32; H04W 76/12; H04W 36/0038; H04W 48/18; H04L 12/4633; H04L 12/4679
See application file for complete search history.

(56) References Cited

U.S. PATENT DOCUMENTS 5,309,503 A 5/1994 Bruckert et al.
5,768,501 A 6/1998 Lewis
(Continued)

FOREIGN PATENT DOCUMENTS

EP 1401229 A1 3/2004
EP 1553734 A1 7/2005
(Continued)

OTHER PUBLICATIONS

"Digital cellular telecommunications system (Phase 2+); Universal Mobile Telecommunications System (UMTS); LTE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.
(Continued)

*Primary Examiner* — Yu-Wen Chang
(74) *Attorney, Agent, or Firm* — Knobbe, Martens, Olson & Bear, LLP

(57) ABSTRACT

A wireless mobile communication device can receive one or more network parameters from a network gateway and identify a network associated with the network parameters based on stored network information of networks with which the device is configured to join and/or network gateways with which the device is configured to communicate. The device can identify private network information associated with the identified network that will enable the device to access one or more private networks via the identified network. Once the device obtains access to the identified network, the device can set up one or more virtual private network (VPN) tunnels to join one or more private networks accessible via the identified network. When using two or more VPN tunnels, one VPN tunnel can be nested within another VPN tunnel.

20 Claims, 7 Drawing Sheets

Related U.S. Application Data

(60) Provisional application No. 62/358,990, filed on Jul. 6, 2016.

(51) Int. Cl.
  *H04W 36/00* (2009.01)
  *H04W 76/12* (2018.01)
  *H04W 48/18* (2009.01)

(52) U.S. Cl.
  CPC ....... *H04W 36/0038* (2013.01); *H04W 76/12* (2018.02); *H04W 48/18* (2013.01)

(56) References Cited

U.S. PATENT DOCUMENTS

| | | |
|---|---|---|
| 6,519,465 B2 | 2/2003 | Stilp et al. |
| 6,842,462 B1 | 1/2005 | Ramjee et al. |
| 6,965,816 B2 | 11/2005 | Walker |
| 7,072,657 B2 | 7/2006 | Watanabe et al. |
| 7,246,045 B1 | 7/2007 | Rappaport et al. |
| 7,317,717 B2 | 1/2008 | Pankajakshan et al. |
| 7,389,534 B1 | 6/2008 | He et al. |
| 7,486,967 B2 | 2/2009 | Pan et al. |
| 7,535,861 B2 | 5/2009 | Buchholz et al. |
| 7,539,158 B2 | 5/2009 | Pan |
| 7,548,763 B2 | 6/2009 | Pan |
| 7,567,822 B2 | 7/2009 | Hart et al. |
| 7,573,713 B2 | 8/2009 | Hoffman et al. |
| 7,653,414 B2 | 1/2010 | Pan |
| 7,684,801 B2 | 3/2010 | Suzuki et al. |
| 7,756,507 B2 | 7/2010 | Morper |
| 7,805,372 B2 | 9/2010 | Weiss |
| 7,817,589 B2 | 10/2010 | Hoffman et al. |
| 7,840,230 B2 | 11/2010 | Pan |
| 7,855,988 B2 | 12/2010 | Pan |
| 7,856,233 B2 | 12/2010 | Pan |
| 7,979,066 B2 | 7/2011 | Pan |
| 8,036,158 B2 | 10/2011 | Pan et al. |
| 8,046,420 B2 | 10/2011 | Pan |
| 8,089,920 B2 | 1/2012 | Pan |
| 8,107,409 B2 | 1/2012 | Pan |
| 8,140,077 B2 | 3/2012 | Saifullah et al. |
| 8,224,322 B2 | 7/2012 | Pan |
| 8,270,325 B2 | 9/2012 | Hoffman et al. |
| 8,310,990 B2 | 11/2012 | Pan |
| 8,326,286 B2 | 12/2012 | Pan |
| 8,340,667 B2 | 12/2012 | Pan |
| 8,359,029 B2 | 1/2013 | Pan |
| 8,374,124 B2 | 2/2013 | Abusch-Magder et al. |
| 8,503,336 B2 | 8/2013 | Rappaport et al. |
| 8,538,458 B2 | 9/2013 | Haney |
| 8,626,210 B2 | 1/2014 | Hicks, III |
| 8,654,749 B2 | 2/2014 | Buchholz et al. |
| 8,676,197 B2 | 3/2014 | Pan et al. |
| 8,688,111 B2 | 4/2014 | Pan |
| 8,706,105 B2 | 4/2014 | Pan |
| 8,744,435 B2 | 6/2014 | Pan |
| 8,780,804 B2 | 7/2014 | Pan |
| 8,811,992 B2 | 8/2014 | Hoole |
| 8,824,969 B2 | 9/2014 | Nakamori et al. |
| 9,055,163 B1 | 6/2015 | Row, II et al. |
| 9,167,442 B2 | 10/2015 | Uelk et al. |
| 9,198,221 B2 | 11/2015 | Schemagin et al. |
| 9,204,376 B2 | 12/2015 | Ullah et al. |
| 9,226,192 B2 | 12/2015 | Graffagnino et al. |
| 9,264,241 B2 | 2/2016 | Balar et al. |
| 9,338,093 B2 | 5/2016 | Eichen et al. |
| 9,444,801 B2 | 9/2016 | Luo et al. |
| 9,445,280 B2 | 9/2016 | Uelk et al. |
| 9,451,646 B2 | 9/2016 | Schemagin et al. |
| 9,686,238 B1 | 6/2017 | Row, II |
| 9,742,729 B2 | 8/2017 | Graffagnino et al. |
| 9,769,674 B2 | 9/2017 | Uelk et al. |
| 9,912,640 B2 | 3/2018 | Row, II |
| 9,924,427 B2 | 3/2018 | Graffagnino et al. |
| 10,021,619 B2 | 7/2018 | Schemagin et al. |
| 10,172,078 B2 | 1/2019 | Graffagnino et al. |
| 10,244,405 B2 | 3/2019 | Uelk et al. |
| 10,257,167 B1 * | 4/2019 | Matthews ........... H04L 12/4633 |
| 10,382,393 B2 | 8/2019 | Graffagnino et al. |
| 10,602,410 B2 | 3/2020 | Graffagnino et al. |
| 10,631,237 B2 | 4/2020 | Graffagnino et al. |
| 10,742,610 B2 | 8/2020 | Row, II et al. |
| 10,750,423 B2 | 8/2020 | Schemagin et al. |
| 10,757,579 B2 | 8/2020 | Uelk et al. |
| 10,873,891 B2 | 12/2020 | Hill et al. |
| 10,979,904 B2 | 4/2021 | Kim |
| 11,134,425 B2 | 9/2021 | Graffagnino et al. |
| 11,184,840 B2 | 11/2021 | Graffagnino et al. |
| 11,240,677 B2 | 2/2022 | Uelk et al. |
| 11,246,031 B2 | 2/2022 | McCutchen et al. |
| 11,252,128 B2 | 2/2022 | Graffagnino et al. |
| 2001/0013107 A1 | 8/2001 | Lewis |
| 2004/0259554 A1 | 12/2004 | Rappaport et al. |
| 2004/0259555 A1 | 12/2004 | Rappaport et al. |
| 2006/0015745 A1 | 1/2006 | Sukigara et al. |
| 2006/0098661 A1 | 5/2006 | Pan |
| 2006/0178153 A1 | 8/2006 | Tenny et al. |
| 2006/0192651 A1 | 8/2006 | Lee |
| 2006/0234747 A1 | 10/2006 | Pan et al. |
| 2006/0234774 A1 | 10/2006 | Pan et al. |
| 2007/0049267 A1 | 3/2007 | Kota et al. |
| 2007/0202847 A1 | 8/2007 | Pan et al. |
| 2007/0232267 A1 | 10/2007 | Pan et al. |
| 2007/0253359 A1 | 11/2007 | Hall et al. |
| 2007/0264930 A1 | 11/2007 | Daoudal |
| 2007/0287452 A1 | 12/2007 | Pan et al. |
| 2008/0005380 A1 | 1/2008 | Kawasaki et al. |
| 2008/0039144 A1 | 2/2008 | Pan et al. |
| 2008/0095070 A1 | 4/2008 | Chan et al. |
| 2008/0108378 A1 | 5/2008 | Gessner et al. |
| 2008/0146158 A1 | 6/2008 | Pan et al. |
| 2008/0181188 A1 | 7/2008 | Aghvami et al. |
| 2008/0268830 A1 | 10/2008 | Sharma et al. |
| 2008/0285492 A1 | 11/2008 | Vesterinen |
| 2009/0117851 A1 | 5/2009 | Malaney |
| 2009/0156213 A1 | 6/2009 | Spinelli et al. |
| 2009/0201878 A1 | 8/2009 | Kotecha et al. |
| 2009/0205023 A1 | 8/2009 | Pan et al. |
| 2009/0227235 A1 | 9/2009 | Pan et al. |
| 2009/0232019 A1 | 9/2009 | Gupta et al. |
| 2009/0271491 A1 | 10/2009 | Pan et al. |
| 2009/0280853 A1 | 11/2009 | Brisebois et al. |
| 2009/0325584 A1 | 12/2009 | Pan et al. |
| 2009/0327819 A1 | 12/2009 | Pan et al. |
| 2010/0008306 A1 | 1/2010 | Pan et al. |
| 2010/0008369 A1 | 1/2010 | Pan |
| 2010/0027448 A1 | 2/2010 | Puthiyandyil et al. |
| 2010/0075668 A1 | 3/2010 | Pan et al. |
| 2010/0105373 A1 | 4/2010 | Kanade |
| 2010/0190470 A1 | 7/2010 | Raleigh |
| 2010/0197268 A1 | 8/2010 | Raleigh |
| 2010/0202455 A1 | 8/2010 | Sundaram et al. |
| 2010/0260098 A1 | 10/2010 | Ulupinar et al. |
| 2010/0260157 A1 | 10/2010 | Buchholz et al. |
| 2011/0059740 A1 | 3/2011 | Pan et al. |
| 2011/0060853 A1 | 3/2011 | Pan et al. |
| 2011/0069654 A1 | 3/2011 | Xu et al. |
| 2011/0122824 A1 | 5/2011 | Muhanna et al. |
| 2011/0130135 A1 | 6/2011 | Trigui |
| 2011/0176536 A1 | 7/2011 | De Franca Lima et al. |
| 2011/0190001 A1 | 8/2011 | Kodikara Patabandi et al. |
| 2011/0195743 A1 | 8/2011 | Jee et al. |
| 2011/0202589 A1 | 8/2011 | Piernot et al. |
| 2011/0223921 A1 | 9/2011 | Pan et al. |
| 2011/0237242 A1 | 9/2011 | Gavrilovich |
| 2011/0263253 A1 | 10/2011 | Zhao et al. |
| 2011/0275364 A1 | 11/2011 | Austin et al. |
| 2011/0300866 A1 | 12/2011 | Ali et al. |
| 2012/0002537 A1 | 1/2012 | Bao et al. |
| 2012/0002607 A1 | 1/2012 | Pan et al. |
| 2012/0039245 A1 | 2/2012 | Wang et al. |
| 2012/0051321 A1 | 3/2012 | De et al. |
| 2012/0057568 A1 | 3/2012 | Lim et al. |

(56) References Cited

U.S. PATENT DOCUMENTS

| | | |
|---|---|---|
| 2012/0094659 A1 | 4/2012 | Pan et al. |
| 2012/0106454 A1 | 5/2012 | Pan et al. |
| 2012/0147874 A1 | 6/2012 | Kotecha |
| 2012/0155375 A1 | 6/2012 | Zhu |
| 2012/0224474 A1 | 9/2012 | Beser |
| 2012/0224566 A1 | 9/2012 | O'Leary |
| 2012/0252444 A1 | 10/2012 | Pan et al. |
| 2012/0269167 A1 | 10/2012 | Velev et al. |
| 2012/0276866 A1 | 11/2012 | Sennett et al. |
| 2012/0294226 A1 | 11/2012 | Racz et al. |
| 2013/0003697 A1 | 1/2013 | Adjakple et al. |
| 2013/0028097 A1 | 1/2013 | Barrett |
| 2013/0029708 A1 | 1/2013 | Fox et al. |
| 2013/0039279 A1 | 2/2013 | Pan et al. |
| 2013/0065583 A1 | 3/2013 | Pan et al. |
| 2013/0130677 A1 | 5/2013 | Pan et al. |
| 2013/0148578 A1 | 6/2013 | Pan et al. |
| 2014/0154967 A1 | 6/2014 | Pan et al. |
| 2014/0173388 A1 | 6/2014 | Pan et al. |
| 2014/0233412 A1 | 8/2014 | Mishra et al. |
| 2014/0315553 A1 | 10/2014 | Hoole |
| 2015/0031361 A1 | 1/2015 | Timus et al. |
| 2015/0163711 A1 | 6/2015 | Norman et al. |
| 2015/0181492 A1 | 6/2015 | Schmidt et al. |
| 2015/0304282 A1 | 10/2015 | Xu |
| 2015/0319774 A1 | 11/2015 | Cai et al. |
| 2015/0358959 A1 | 12/2015 | Meshkati et al. |
| 2016/0157281 A1 | 6/2016 | Syed et al. |
| 2016/0316406 A1 | 10/2016 | Henry et al. |
| 2016/0345192 A1 | 11/2016 | Garg et al. |
| 2016/0359738 A1 | 12/2016 | Sullenberger et al. |
| 2016/0365882 A1 | 12/2016 | Kim et al. |
| 2017/0011126 A1 | 1/2017 | Lerman et al. |
| 2017/0012870 A1* | 1/2017 | Blair .................. H04L 45/04 |
| 2017/0026823 A1 | 1/2017 | Mohammed et al. |
| 2017/0099159 A1* | 4/2017 | Abraham ............ H04L 65/102 |
| 2017/0238229 A1 | 8/2017 | Schemagin et al. |
| 2017/0279708 A1 | 9/2017 | Liu |
| 2018/0013724 A1 | 1/2018 | Row, II |
| 2018/0014340 A1 | 1/2018 | Hill et al. |
| 2018/0192264 A1 | 7/2018 | Kwok et al. |
| 2018/0376325 A1 | 12/2018 | Xu et al. |
| 2019/0053145 A1 | 2/2019 | Ieshiro et al. |
| 2019/0150057 A1 | 5/2019 | Wang et al. |
| 2019/0320356 A1 | 10/2019 | Shaw et al. |
| 2019/0320358 A1 | 10/2019 | Knapp |
| 2019/0394738 A1 | 12/2019 | Abedini et al. |
| 2020/0036677 A1 | 1/2020 | Graffagnino et al. |
| 2020/0037213 A1 | 1/2020 | Chen et al. |
| 2020/0059785 A1 | 2/2020 | McCutchen et al. |
| 2020/0267615 A1 | 8/2020 | Graffagnino et al. |
| 2020/0336974 A1 | 10/2020 | Graffagnino et al. |
| 2021/0084560 A1 | 3/2021 | Schemagin et al. |
| 2021/0176213 A1 | 6/2021 | Row, II |
| 2022/0232377 A1 | 7/2022 | McCutchen et al. |
| 2022/0232394 A1 | 7/2022 | Uelk et al. |
| 2022/0232441 A1 | 7/2022 | Graffagnino |
| 2022/0240167 A1 | 7/2022 | Graffagnino et al. |

FOREIGN PATENT DOCUMENTS

| | | |
|---|---|---|
| EP | 2031920 A1 | 3/2009 |
| GB | 2452796 | 3/2009 |
| WO | WO 2007/044880 | 4/2007 |
| WO | WO 2009/100736 A1 | 8/2009 |
| WO | WO 2009/127965 A1 | 10/2009 |
| WO | WO 2014/031597 | 2/2014 |
| WO | WO 2014/031689 A1 | 2/2014 |
| WO | WO 2014/179235 | 11/2014 |

OTHER PUBLICATIONS

"Digital cellular telecommunications system (Phase 2+)(GSM); Universal Mobile Telecommunications System (UMTS); LTE; Non-Access-Stratum (NAS) functions related to Mobile Station (MS) in idle mode (3GPP TS 23.122 version 13.4.0 Release 13)", May 2016, 52 pages.

Kaul, et al.: "On the adpatation of commercial smartphones to tactical environments", Military Communications Conference, 2011, Nov. 7, 2011, pp. 2205-2210.

Nystromer, "Quiclink: A Portable 3G WCDMA Cellular Service, Deployed in Minutes" Presentation, Jun. 11, 2007, pp. 1-27.

Press Release: Harris Corporation Introduces Tactical 3G Cellular Network-in-a-Box for Warfighters, Published Apr. 19, 2011, http://harris.com/view_pressrelease.asp?pr_id=3230.

Press Release: Tecore Unveils The Mobile Industry's First 3G-4G Network in A Box (NIB), Published Feb. 14, 2011, http://www.tecore.com/newsevents/release.cfm?newsID=164.

Tecore Networks, The Mobile Industry's First All-In-One Network Solution Supporting WCDMA, HSPA+ and L TE, first release Feb. 14, 2011, http://www.tecore.com/solutions/TecoreNetworks-Datasheet-2G-3G-4G-Networkl nABox.pdf.

International Search Report and Written Opinion dated Feb. 11, 2014, International Application No. PCT/US2013/055864.

International Search Report and Written Opinion dated Nov. 8, 2013, International Application No. PCT/US2013/055721.

International Search Report and Written Opinion dated Sep. 26, 2014, International Application No. PCT/US2014/035732.

ETSI TS 136 331 v9.00 (2009-1) (Year: 2009).

Sorokin et al., "Multifunction measuring system for monitoring of coverage area of mobile network operator.", International Siberian Conference on Control and Communications (SIBCON). IEEE, 2016 in 8 pages.

* cited by examiner

SECURE NETWORK ROLLOVER

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

In some instances, it can be difficult for a user equipment to rollover from one network to another network, especially if the second network is a secure network.

DETAILED DESCRIPTION

Figure 1:
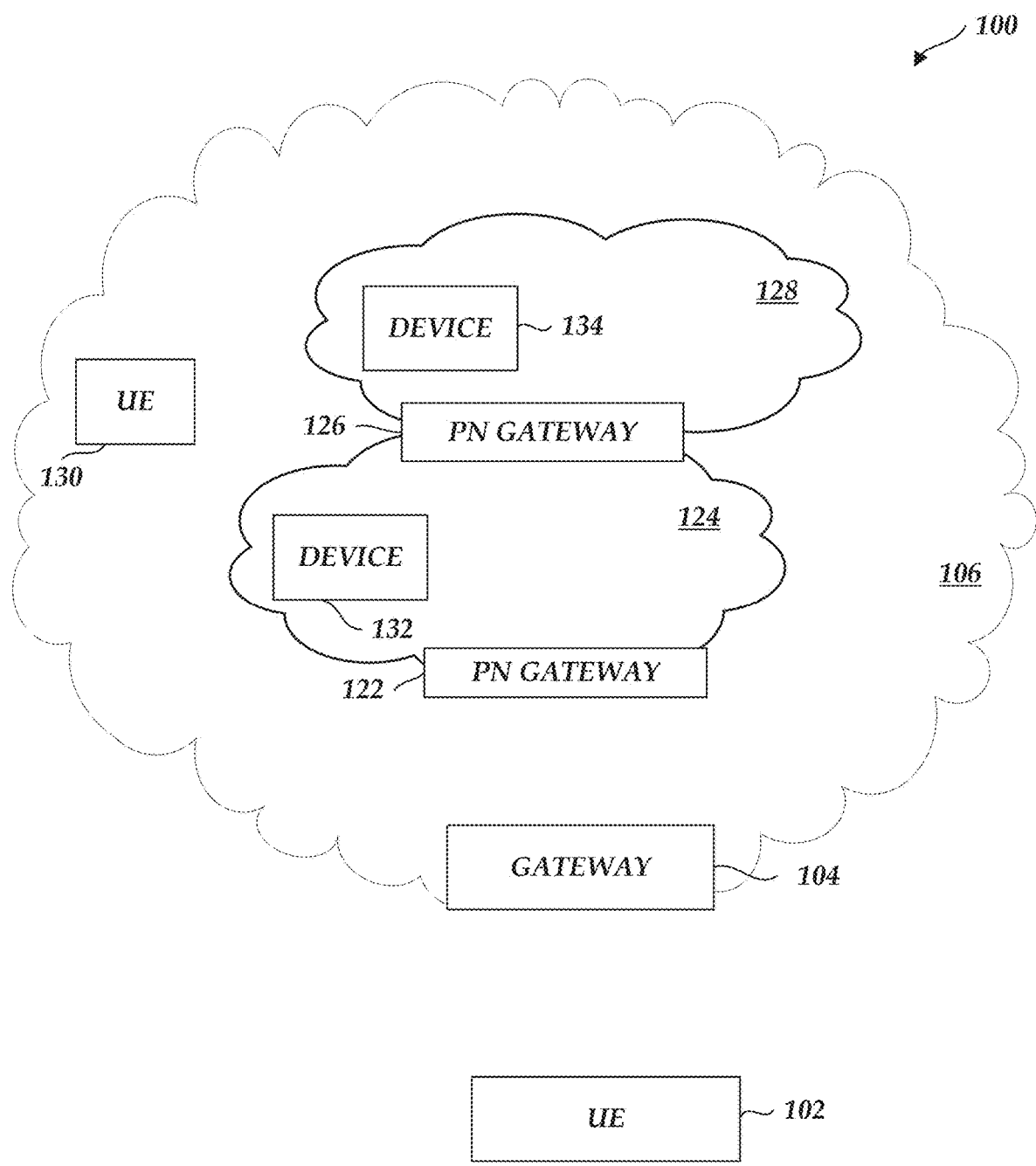
FIG. 1 is a diagram illustrative of an embodiment of an environment for accessing a network.

When a user equipment (UE) (sometimes referred to as a wireless mobile communication device) leaves a network's coverage area (non-limiting examples: cellular network, other wireless network, or other network), loses connection with the network, enters the coverage area of a different network, detects a new or stronger network, or it is otherwise desirable to switch network connections, it may be appropriate for the UE to quickly or automatically establish a connection with another network. However, when a secure network is desired, it can be difficult for the UE to establish the connection with the secure network because of strict secure network requirements. Further, in emergency or hostile situations, each moment taken to manually establish the connection with the secure network can increase the likelihood of injury or death.

In some embodiments, the UE can have stored thereon network information of networks with which the UE is configured to join and network gateways with which the UE is configured to communicate. The network information for each network (or network gateway) can include, but is not limited, to network parameters of the network, private network information for private networks accessible via the network, and/or endpoint information of endpoints accessible via the network and/or via the private networks associated with the network.

In some embodiments, a UE receives one or more network parameters from a gateway associated with a network. In some cases, the UE receives the network parameter in conjunction with a network change (non-limiting examples, the UE detects that it has left one network (source network) and joined another (destination network), etc.) or in conjunction with moving into a coverage area that corresponds to a destination network.

Using the received network parameter(s), the UE can identify the destination network (sometimes referred to herein as a primary network) associated with the network parameter. To identify the destination network, the UE can compare the received network parameter with the network parameters stored by the UE that are associated with the networks with which the UE is configured to establish a communication link in order to identify the destination network(s) associated with the gateway.

The network parameters stored on the UE can include, but are not limited to, network identifiers (e.g., IP addresses, access point identifiers, access point names (APN), network names, service set identifiers (SSIDs), public land mobile network (PLMN) identifiers, session IDs), radio access components or eNodeB identifiers, radio access technology (RAT) identifiers, frequency band(s), device identifiers, device names, geographical data, or other network parameters that are associated with various networks that the UE is configured to join.

Similarly, the network parameter(s) received from a network gateway can correspond to one of the different types of network parameters stored on the UE. For example, the network parameter(s) received by the UE can correspond to an IP address of the gateway, IP address assigned to the UE by the gateway, APN of the gateway, SSID of the network, PLMN identifier of the network, RAT of the network, frequency bands used by the network gateway, geographic location of the coverage area of the network or gateway, etc.

In some cases, the IP addresses can correspond to one or more IP addresses of the network gateway and/or the IP addresses assigned by the network gateway (e.g., a range of IP addresses that the network gateway assigns to devices on the network). The access point identifiers can correspond to an identifier of the gateway, such as an APN of the network gateway, or the name of the network. The session IDs can correspond to identifiers assigned by the gateway to UEs during each session. The RAT can correspond to the underlying physical connection method for radio based communication between the network gateway and the UE.

The geographical data can correspond to the actual and/or expected geo-location of the network and/or network gateway. For example, the geographical data can correspond to one or more GPS coordinates or GPS mapping of where the network gateway is physically located, where the network gateway is expected to physically be located, where the covered area of the network is physically located, and/or where the covered area of the network is expected to physically be located.

Upon identifying and determining that the destination network is a network with which the UE is configured to communicate, the UE can analyze the network information associated with the destination network that is stored on the UE to identify the private network information of the private networks that are associated with and accessible via the destination network.

The private network information can include, but is not limited to, any one or any combination of private network parameters, private network applications, or private network credentials. Using the stored private network information, the UE can access one or more private networks via the destination network or the UE can set up one or more VPN tunnels in order to communicate with one or more different private networks accessible via the destination network.

The private network parameters stored on the UE can be similar to the network parameters as described herein. In some cases, rather than being associated with one or more networks like the network parameters, the private network parameters are associated with one or more private networks accessible via a network (e.g. a destination network). For example, the private network parameters can include, but are not limited to, private network identifiers (e.g., IP addresses, access point identifiers, access point names (APN), or network names, for private networks) or server identifiers of the private networks. In some cases, the IP addresses can correspond to one or more IP addresses of a private network gateway and/or the IP addresses assigned by a private network gateway (e.g., a range of IP addresses that the private network gateway assigns to devices on the private network). The access point identifiers can correspond to an identifier of the private network gateway, such as an APN of the private network gateway, or the name of the private network.

In addition or alternatively, the private network parameters can include access point protocols (e.g., IPv4, IPv6), SSIDs of private networks, PLMN identifiers of private networks, session IDs for private networks or eNodeB identifiers of a private network. In some cases, the SSIDs can correspond to identifiers of a wireless local-area network (WLAN) which can differentiate one WLAN from another. The PLMN identifiers can be associated with a mobile country code (MCC) for the private networks or a mobile network code (MNC) for the private networks. The session IDs can correspond to identifiers assigned by the private network gateway to UEs during each session. The eNodeB identifiers can correspond to hardware connected to a private network.

In some instances, the private network parameters can include radio access technology (RAT) identifiers, frequency band(s) used by a private network gateway, device identifiers (e.g. device names), geographical data (e.g., location data of a coverage area of a private network or private network gateway), or other network parameters that are associated with various private networks that the UE is configured to join. The RAT can correspond to identifiers of the underlying physical connection method for radio based communication between the private network gateway and the UE. The device identifiers can correspond to endpoints accessible via a private network The private network parameters can include private network configuration parameters (e.g., IP address, subnet mask information, default gateway information, private network gateway port information, DNS server information and host name information, each associated with a private network), proxy identifiers (e.g., proxy IDs, proxy server addresses, etc.) of the private networks, multimedia messaging service (MMS) identifiers of the private networks (e.g., multimedia message service center (MMSC) URL data, multimedia message proxy address, multimedia port numbers, usernames, passwords, APNs, operators, etc.).

In some cases, the private network parameters can include parameter associated an authentication type for the private networks (e.g., using a MAC-address or Extensible Authentication Protocol (EAP) authentication), a bearer identifier for the private networks (e.g., an identifier associated with a connection between two endpoints of the network or private network), or mobile virtual network operator (MVNO) types for the private networks (e.g., reseller, service operator, full MVNO, mobile virtual network enabler, mobile network operator).

In some cases, the private network applications stored on the UE can include, but are not limited to, applications used to set up a connection to the private networks or programs (e.g., VPN client program) to establish a VPN tunnel to the private networks. In certain cases, a VPN client program can enable the UE to access one or more private networks via the destination network. The VPN client program can contact the relevant VPN server, provide it with relevant credentials, such as a username, password, certificates, etc., and then setup the VPN tunnel so that communications between the UE and the VPN server are encrypted.

In some cases, the private network credentials can correspond to one or more of authentication data associated with one or more private networks such as a MAC address, SIM card information, serial number, certifications, certificate authority information, user certificate information, username, password, password-derived keys, hashes, salted hashes of unique device properties and/or user passwords). In addition or alternatively, the private network credentials can include VPN authentication credentials for the private networks including, but not limited to, VPN server name or address, Internet key exchange (IKE) Key identifiers (e.g., type, identity, version requirement, etc.), and cryptographic information (e.g., Diffie-Helman groups, cryptographic keys supported for one or more VPN tunnels to the private networks, suite B encryption settings, phase 1 encryption settings).

In some embodiments, the UE identifies private network credentials or applications (such as digital certifications, VPN client programs or applications, etc.) that enable the UE to access one or more private networks via the destination network. In some embodiments, once the UE obtains access to the destination network, the UE can set up one or more VPN tunnels in order to communicate with one or more different private networks accessible via the destination network. For example, the UE can setup a VPN tunnel to communicate with a private network by identifying private network credentials stored on the UE (e.g., a username and password) and providing the identified credentials to a gateway associated with the private network. In certain embodiments, when using two or more virtual private network tunnels, one virtual private network tunnel can be nested within another virtual private network tunnel.

In addition, the UE can communicate with endpoints accessible via the destination network, including endpoints located within a private network associated with the destination network. In some cases, the UE communicates with the endpoints based on the endpoint information included as part of the network information stored on the UE. The endpoint information can include, but is not limited to, any one or any combination of identifiers which can allow the UE to access one or more endpoints (non-limiting examples: endpoint name, endpoint IP address, or other UE identifier, device identifier, server identifier, or network identifier, etc., within the destination network 406). In some embodiments, the UE receives or is assigned a network identifier, such as an IP address, from a gateway associated with the destination network and can use the received network identifier to access the one or more endpoints via the destination network.

Non-Limiting Example

As a non-limiting example, and with reference to FIG. 1, a network gateway 104 is accessible via a wireless network, such as a cellular or Wi-Fi network, and provides access to a network 106 (sometimes referred to as a destination network). In some instances, the network 106 enables access to one or more private networks 124, 128, which can be secure and/or highly secure networks (HSN), other UE 130, a backhaul, a wide area network (WAN), such as the Internet, other endpoints, etc.

In the non-limiting example, the UE 102 is located in a wireless network coverage area (non-limiting example: a cellular network coverage area) that corresponds to the network gateway 104 and desires to communicate with endpoints in the private networks 124, 128. Further, in the non-limiting example, the UE 102 has the proper private network information (non-limiting example: private network credentials) to access the private networks 124, 128 and/or has the proper network information regarding the network 106 (non-limiting example: network parameters and credentials) to access the network 106. For example, UE 102 includes stored network information (non-limiting examples: network parameters, private network information, endpoint information, or software for establishing a VPN connection, such as one or more VPN clients) to enable the UE 102 to access the network 106, private network (PN) 124, PN 128, or UE 130.

The UE 102 can receive a network parameter from the gateway 104. The UE 102 can receive the network parameter as part of a broadcast message and/or during bi-directional communications with the gateway 104, such as during a registration/authentication process with the gateway or upon joining the network 106 associated with the gateway 104.

The UE 102 can use the network parameter in conjunction with the network information stored on the UE 102 to identify the network 106 associated with the gateway 104. For example, the UE 102 can compare the network parameter with the network parameters it has stored thereon to determine from with which network the received network parameter is associated. Based on the identification, the UE 102 can identify the proper credentials to access the PN 128.

Once the UE 102 has joined the network 106 (either prior to or after identifying the network 106), the UE 102 can implement the procedures to establish a connection to the PN 128 using the identified PN 128 credentials. In this particular example, to access PN 128, the UE 102 first establishes a VPN tunnel with the PN 124 via the PN gateway 122 using private network credentials that correspond to the PN 124. Once the VPN tunnel to the PN 124 is established, the UE 102 establishes a second VPN tunnel through the PN 124 to PN 128 via PN gateway 126. In this way, the second VPN tunnel to PN 128 is layered, or tunneled, within the first VPN tunnel to PN 124. For example, the UE can be configured with a dynamic layering of authentication software (e.g., VPN clients) which can direct routing information of the second VPN tunnel through first VPN tunnel. It will be understood that in other examples and embodiments, the UE 102 may not access a private network, may access only a single private network, or may access multiple private networks without layering the VPN tunnels, etc.

Environment Overview

FIG. 1 is a diagram illustrative of an embodiment of an environment 100 for accessing a network 106. In the illustrated embodiment, the environment 100 includes a UE 102 and a network gateway 104 for accessing a network 106. The environment 100 in the illustrated embodiment further includes a first PN gateway 122 that provides access to one or more endpoints (e.g., computing device 132) within a first (virtual) private network 124, and a second PN gateway 126 that provides access to one or more endpoints (e.g., computing device 134) within a second (virtual) private network 128.

The UE 102 can be implemented using one or more, cell phones, smart phones, tablets, computers, laptops, tracking devices, targeting devices, weapons systems, mobile computing device, any electronic device configured to communicate with a network (non-limiting examples: a cellular network or other wireless network, or wired network), and/or any device configured for the internet of things. As such, the UE 102 can include a processor and data store (non-limiting example: non-transitory computer-readable media) that includes computer-executable instructions that when executed by the processor cause the processor to perform a number of functions, programs, applications, and/or services. The UE can also include a transceiver and an antenna to provide wireless communication using one or more radio bands, as well as a screen, input and output components, etc.

In addition, the UE 102 can include stored network information, such as network parameters for the network 106 (non-limiting examples: IP addresses of, or assigned by, the gateway 104, APNs of the gateway 104, SSIDs of the gateway 104 or network 106, etc.), private network information (non-limiting examples: one or more PN credentials in order to access the PN 124, 128, etc., as described in greater detail herein), and/or endpoint information. Furthermore, the UE 102 can include computer-executable instructions to connect to the network 106, access one or more PNs 124, 128 within the network 106, etc., as described in greater detail herein.

Figure 2:
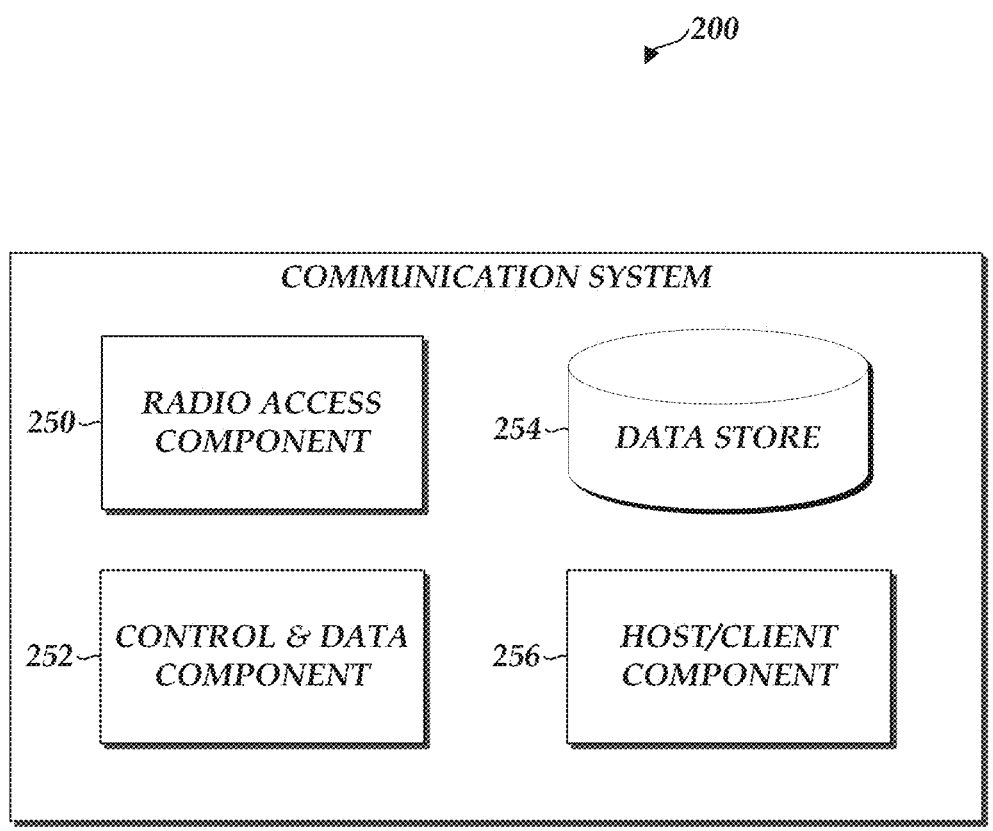
FIG. 2 is a block diagram of an embodiment of a communication system.
Figure 3:
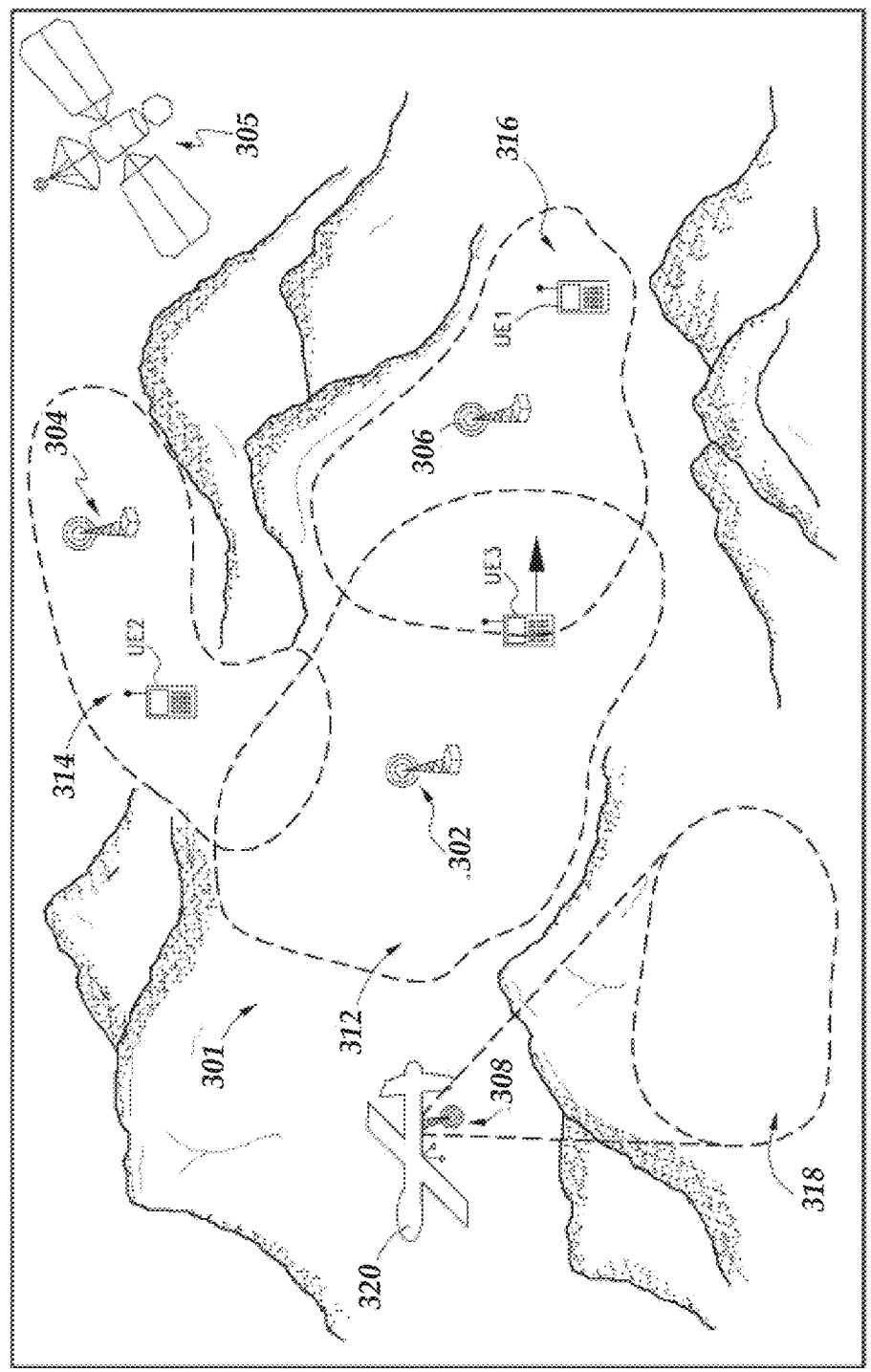
FIG. 3 is a diagram of an embodiment of multiple communication systems in an environment.

The network gateway 104 can be implemented as a communication system, described in greater detail herein with reference to FIGS. 2 and 3, or a portion thereof, such as a packet data network gateway (PGW) of the communication system. In some embodiments, the network gateway 104 can be implemented separately from the communication system, such as a base station, PGW, or gateway, of a cellular network, a modem, router, firewall, or server, or other device that can communicate with the UE 102 via wired or wireless communication, assign one or more network identifiers to the UE 102, and/or provide the UE 102 access to other networks or devices. In some embodiments, the network gateway 104 can be a VPN gateway and be configured to pass, block, or route VPN traffic and can provide networking services such as IP address assignment and management, dynamic and static routing, and the maintenance of routing tables, etc.

The network gateway 104 can enable the UE 102 to access to the network 106, as well as to one or more UE 130, other devices (not shown), private networks 124, 128, the Internet, etc. In some embodiments, the network 106 can be identified using a network parameter received from the network gateway (non-limiting examples: access point identifier, access point name, network name, network identifier, device identifier, device name, IP address, etc.).

The PN gateways 122, 126 can be implemented similar to the network gateway 104 and enable access to their respective private networks 124, 128. For example, the PN gateways 122, 126 can be configured to validate the UE 102 for a particular PN 124, 128 and provide the UE 102 with an identifier for the PN 124, 128. In addition, the PN gateways 122, 126 can be configured to pass, block, or route VPN traffic and provide networking services such as IP address assignment and management, dynamic and static routing and the maintenance of routing tables, etc.

In some embodiments, the UE 102 includes one or more applications, such as a VPN client application, to communicate with the PN gateways 122, 126 and establish a VPN tunnel to the respective PN 124, 128. In some cases, a VPN tunnel can provide authentication and data encapsulation within an encrypted tunnel. In certain cases, VPN tunnels can be nested to provide multiple layers of encryption for each byte of data that is transmitted and received. The VPN client application can use private network information, such as one or more certifications, credentials, identifiers, and/or passwords, to establish the VPN tunnel. In some cases, a separate VPN client application is used for each PN that the UE 102 accesses or for multiple PNs that the UE 102 accesses.

It will be understood that the environment 100 can include fewer or more components as desired and/or be configured differently than what is shown in FIG. 1. For example, in some embodiments, the environment 100 can omit any one or any combination of the PN gateways 122, 126 or PNs 124, 128. In some embodiments, the network information enables the UE 102 to access the network 106, but not the PNs 124, 128. Although illustrated as being outside the PN 124, it will be understood that in some embodiments, the PN 128 is located within, or accessible via only, the PN 124. For example, in some embodiments, the PN 128 can be a highly secure network, and accessible via a VPN tunnel within a second VPN tunnel (non-limiting examples: accessible via the PN 124.)

Communication System Overview

A cellular network typically includes multiple stationary antennas, base stations, or the like, in different locations that communicate with a mobile telephone switching office (MTSO) and/or one or more core network components (generally referred to as the core or core network) that are remotely located from the different base stations. The MTSO or mobile core determines how calls are routed between the base stations and enables the base stations to communicate with each other for handover purposes. If a base station cannot communicate (non-limiting example: via a backhaul) with the MTSO or mobile core, or the rest of the network, all communications at that base station are lost and user equipment (UE) in corresponding network areas cannot communicate with other UE, even if the UE trying to communicate with each other are in the same network area. In addition, the base stations are built to be stationary so that UE within a particular geographic area always have network access.

When a user moves from one network to another network, the mobile cores of the two networks communicate with each other to handle the handover and other configuration details (non-limiting example: a core network component of the first cellular network communicates with a core network component of the second cellular network). In addition to communicating for handover purposes, core network components from different cellular networks may also communicate in order to route data (non-limiting examples: voice data, video data, application data, control data, etc.) from a user in a first cellular network to another user in a second cellular network.

FIG. 2 is a block diagram of an embodiment of a communication system 200 that can independently provide a cellular network that is mobile. In certain embodiments, the communication system 200 can also be referred to as a mobile cellular network (MCN) communication system. In the illustrated embodiment, the communication system 200 includes a radio access component 250, which can be used to send/receive wireless communication to/from the communication system 200, a control and data component 252, and a data store 254. The communication system 200 can include fewer or more components as desired and as described in greater detail in U.S. application Ser. Nos. 13/972,112 and 14/264,297, entitled Mobile Cellular Networks and Mobile Cellular Network Backhaul, respectively, each of which is incorporated by reference herein in its entirety. For example, the communication system 200 can include and/or can communicate with an antenna, satellite dish, and the like, to receive data from UE or other endpoints, other communication systems, satellites, and the like. In certain embodiments, the communication system 200 can communicate with multiple eNodeBs, base stations, or the like, to increase its coverage area. In addition, in an IP network architecture, the received/transmitted data can all be in the form of IP data packets.

One or more communication systems can be deployed in areas where cellular networks are not available and each communication system can independently provide a self-contained cellular network that is portable during operation for devices in respective coverage areas. In some cases, multiple communication systems can be networked together to create a network of communication systems, also referred to herein as a NOM, as described in greater detail in U.S. application Ser. Nos. 13/972,112 and 14/264,297, incorporated by reference. The different communication systems within the NOM or between NOMs, can communicate with each other via a backhaul using a variety of communication technologies, including satellite communication, microwave or radio wave communication, OFDM, WiMAX, LTE, etc., as described in greater detail in U.S. application Ser. Nos. 13/972,112 and 14/264,297, incorporated herein by reference, and, in some cases, NOMs can communicate with each other. As further described in U.S. application Ser. Nos. 13/972,112 and 14/264,297, incorporated herein by reference, when networked together, some communication systems can be configured as master devices or hosts and other communication systems can be configured as secondary devices, clients and/or relays.

In some embodiments, each of the components of the communication system 200 can include an identifier, such as an IP address, MAC address, etc. Furthermore, in certain embodiments, the network (in some embodiments a MCN) provided by the communication system 200 can include one or more network identifiers, such as access point names, etc. In some embodiments, different types of data can be associated with different access point names. For example, voice-over-IP (VOIP) data can be associated with one access point of the communication system, Internet data can be associated with a different access point of the communication system, etc. Similarly, video data, video data, audio data, file transfer data, text or short message service (SMS) data, multimedia or multimedia message service (MMS) data, etc., can each be assigned to a different APN, or grouped together in any combination on the same APN, as desired. In some cases, the use of different APNs can be based on network policy, such as, but not limited to, treatment of different types of packets or data, treatment of different users. In certain cases, the use of different APNs can be based on billing systems (e.g., the ability to charge for different types of data), carrier grade redundancy (e.g., making data paths for some type of data more resilient than others, such as to make voice data more reliable than Internet data). Furthermore, in some cases, some types of data can be blocked, such as during authentication, depending on the network deployment. Packets sent over the network can use the network identifiers of the communication system 200 to identify the communication system that is to process the packet and/or that can access a particular destination, etc.

In some embodiments, the communication system 200 can function in an independent mode where communication with other communication systems or a backhaul communication is limited or non-existent. In such embodiments, upon receiving a packet of data, the first communication system can refer to a look-up table stored in a data storage device to determine whether a destination identifier of the packet is within its covered area. If the destination is within the covered area (non-limiting examples: an endpoint within the covered area, a component of the communication system, etc.), the communication system can transmit the data to the destination. The data can include any one or more types of communications, including, but not limited to, user plane data (non-limiting examples: voice data, video data, e-mail, SMS data, picture data, files, requests for information, etc.) or control plane data. If the first communication system determines that the destination is not within its covered area, the first communication system can transmit a message to the source that communication with the destination is not available, etc.

The communication system can also function in a networked mode such that communication with a destination is available even if the destination is not located within the communication system's covered area. In some instances, the destination may be accessible via the Internet (non-limiting examples: via satellite or wired communication), microwave communication, LTE backhaul, or other form of backhaul technology, etc.

In some embodiments, multiple communication systems 200 can be related together. In addition, in certain embodiments, when in the networked mode multiple communication systems can be associated together and/or networked together as described in greater detail in U.S. application Ser. No. 13/972,112, previously incorporated herein by reference in its entirety.

Furthermore, when related together, the communication systems can have different functionality depending on their relationship with the other communication systems. For example, as described in greater in U.S. application Ser. Nos. 13/972,112 and 14/264,297, incorporated herein by reference, when related together, one of the communication systems can be designated as a host communication system or Master Device, while the remaining communication systems can be designated as client communication systems, relay communication systems, and/or Secondary Devices.

Furthermore, when multiple communication systems are networked together, a UE can move from the covered area of a first communication system to the covered area of a second communication system without disrupting the service of the UE. As the UE moves from the first communication system to the second communication system, the first and second communication system can effectuate a handover that updates which communication system is the local MCN for the UE. For example, as part of the handover routine the UE can establish a first cellular communication link with the first communication system and terminate a second cellular communication link with the second communication system. Any communication systems to which the UE is registered (non-limiting example: a registered communication system) can similarly update its routing table and any session identifiers in order to continue providing a communication pathway or link for the UE.

With continued reference to FIG. 2, the control and data component 252 can be implemented using one or more computer processors, FPGAs, microcontrollers, etc., and can perform the various operations of the communication system 200. In an IP network architecture, such as 4G LTE, the control and data component 252 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-communication system handovers. For idle state UE, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the communication system 200 and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the communication system.

Similarly, the control and data component 252 can perform the attachment and detachment of UE, authentication procedures, gateway selection, managing PDN connections, UE tracking and paging, etc. The control and data component 252 can also handle the user data between the radio access component and an external IP network, packet routing and forwarding, handover functions between communication systems, packet buffering initiation of network triggered service request procedures, quality of service policy enforcement, static policy, subscriber location management, subscriber data, and the like. In addition, the control and data component 252 can perform additional procedures as described in greater detail in U.S. application Ser. No. 13/972,112, previously incorporated herein by reference.

The data store 254 can include data regarding the UE in communication with the communication system 200 and within the coverage area corresponding to the communication system 200, such as UE location, authentication keys, etc. In some embodiments, such as IP network architecture, such as a 4G LTE network, the data store 254 can include a home subscriber server (HSS). In addition, the data store 254 can include information regarding other communication systems that are registered with the communication system 200.

The HSS can include subscription information for all UE (including client communications systems that are registered as UE) associated with the communication system, such as all the UE located within the covered area of a communication system and/or the UE located within the covered area of related or associated communication systems. The HSS can store, for example, authentication parameters, security keys, and subscription information for UE within the communication system or associated with the communication system. Furthermore, the HSS can include subscriber location information and be involved with subscriber data handling, authentication procedures, etc.

Similarly, the data store 254 can further include data identifying other related communication systems. In some cases, the data identifying the other related communication systems can be used to communicate with the other communication systems.

FIG. 3 is a diagram of an embodiment of multiple communication systems 302, 304, 306, 308 and their corresponding coverage areas 312, 314, 316, and 318, respectively. As described herein and in greater detail in U.S. application Ser. Nos. 13/972,112 and 14/264,297, previously incorporated herein by reference, the communication systems 302, 304, 306, 308, in some embodiments, can be networked together to form a network of communication systems (NOM).

In the illustrated embodiment, some of the coverage areas 312, 314, 316 are managed by communication systems 302, 304, 306 that are on the ground. However, as illustrated with communication system 308, the communication systems can be located on a moving object, such as an airplane, drone 320, automobile, ship, boat, or other vehicle. As such the coverage areas can move with the communication system. Furthermore, as illustrated, the coverage areas 312, 314, 316 are adjacent to each other, while coverage area 318 is not adjacent to any of the other coverage areas.

The communication systems 302, 304, 306, and 308 can communicate with each other via any one, or any combination, of satellite communication via satellite 305, microwave, or radio wave communication, OFDM, WiMAX, LTE backhaul, etc.

The illustrated embodiment of FIG. 3 further includes the UE1 located within coverage area 316, the UE2 located within coverage area 314, and the UE3 located within overlapping coverage areas 312 and 316 and moving towards communication system 306.

Non-Limiting Example

As a non-limiting example, and with reference to FIG. 3, the UE3 is located within overlapping coverage areas 312 and 316 that correspond to communication systems 302 and 306, respectively. Similar to gateway 104 of FIG. 1, communication systems 302, 306 can enable the UE3 to access a source network (for example, associated with communication systems 302) and a destination network (associated with communication systems 302), respectively, as well as one or more other UE, other devices, private networks (non-limiting example: a highly secure network), the Internet, etc.

In this example, the UE3 has accessed a highly secure network via communication system 302 and having entered the coverage area 316, the UE3 received one or more network parameters from the communication system 306. In response to receiving the network parameter(s), the UE3 can identify a network (sometimes referred to as a destination network) associated with the communication system 306 by comparing the received parameters to one or more stored network parameters. For example, the UE3 can access stored network parameters that are associated with various networks with which it is configured to connect, and compare the stored network parameters with the network parameters received from the communication system 306. Based on the comparison, the UE3 can identify the network associated with the received network parameter, the network to which the UE3 is connected, or determine whether the UE3 is configured to join the network associated with the communication system 306.

In this example, having identified the destination network using the received network parameter and the stored network parameters of the network information, the UE3 can identify additional network information associated with the destination network, such as, private network information associated with private networks accessible via the destination network, and endpoint information associated with endpoints that are accessible via the destination network (non-limiting examples: in the destination network or in the private networks associated with the destination network, etc.) prior to, after, or while it identifies other network information (non-limiting examples: network identifiers).

In some embodiments, using the received network parameters (non-limiting examples: APN, RAT, PLMN, etc.), the UE3 joins the destination network. In certain embodiments, the received network parameters indicate that the UE3 has joined the destination network (non-limiting examples: IP address, point-of-presence, etc.). In certain embodiments, the UE3 joins the destination network based on a detected network change. The detected network change can, for example, be associated with an established connection with communication system 302 (non-limiting examples: a weakening or lost connection), a connection to communication system 306 (non-limiting examples: a new or strengthening signal), movement by the UE3, receipt of a network parameter from communication system 306, etc. In addition or alternatively, the detected network change can correspond to a user input or a user's request to disconnect from communication system 302 or communicate with a different communication system, such as communication system 306. In some embodiments, the detected network change includes one or more of a change of IP address of the UE3, a change in point-of-presence (e.g., an access point to the Internet) of the UE3, a change of IP address of a network gateway, a change in APN, a change in network identifier, a change in SSID, a change in session ID, a change in RAT, a change in PLMN, a change of tunnel or TUN interface (e.g., a change of interface on an operating system), a network change system event or a change in some other network parameter.

In some embodiments, as part of joining the network, the UE3 uses network parameters broadcast by the gateway, to initiate a procedure, such as a random-access procedure, to establish a low-level connection to the communication system 306. Upon establishing the low-level connection, the UE3 initiates a procedure, such as an RRC connection, to join the network associated with the communication system 306.

Once the UE3 has joined and identified the destination network, the UE3 can access the stored private network information to execute one or more applications and/or provide the proper credentials to join the private network(s) available via the destination network. In some cases, in order to access a particular private network, the UE3 provides multiple private network credentials and/or establishes multiple VPN tunnels. In some cases, the VPN tunnels are layered such that one VPN tunnel is established within another VPN tunnel. As a non-limiting example, the UE3 can access a highly secure network by establishing a first virtual private network (VPN) tunnel to a first private network and establishing a second VPN tunnel (non-limiting example: nested within the first VPN tunnel) to the highly secure network.

Because the network information is stored on the UE3, the UE3 can maintain permissions which enable the UE3 to automatically access one or more networks, access one or more private networks available via the associated networks, and/or access or use one or more endpoints available via the associated networks or private networks. Thus, the UE3 will have the proper credentials to access one or more networks, even if the networks are private or highly secure.

Network Rollover

Figure 4A:
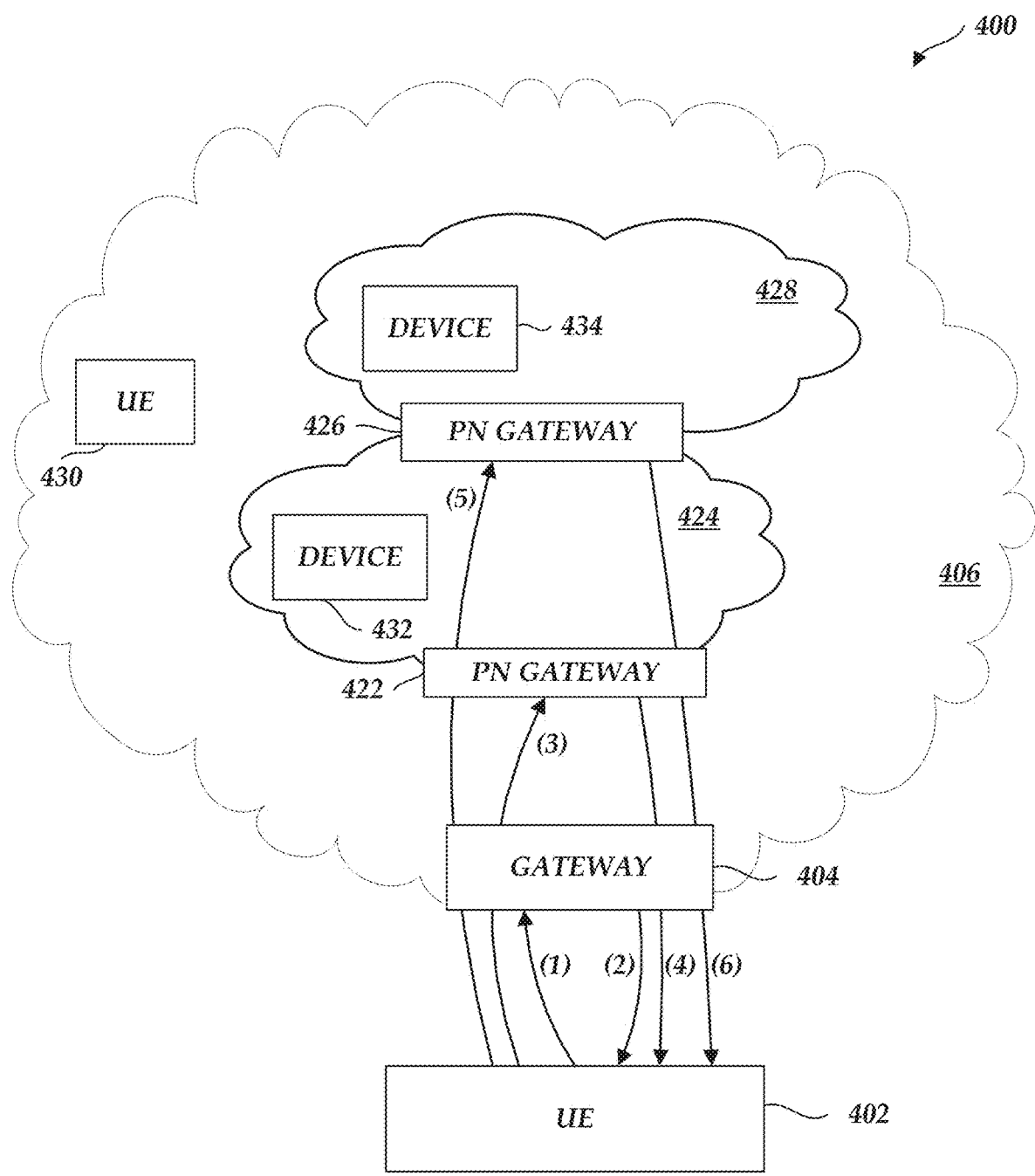
FIG. 4A is a data flow diagram illustrative of an embodiment of communications between various devices to establish one or more virtual private network tunnels.

FIG. 4A is a data flow diagram illustrative of an embodiment of communications between various devices within the environment 400 to establish one or more virtual private network (VPN) tunnels associated with a communication system. As described herein, it will be understood that the environment 400 can include fewer or more components as desired and/or be configured differently than what is shown in FIG. 4A. For example, in some embodiments, the environment 400 can omit the first PN gateway 422, the first PN 424, the second PN gateway 426, and/or the second PN 428.

At (1), the UE 402 communicates with the network gateway 404. In some embodiments, as part of the communication, the UE 402 requests access to network 406, for example, by providing an access point to, or requesting an access point from, the network gateway 404. However, it will be understood that the UE 402 can request or gain access to the network 406 or any other network in a variety of ways (non-limiting example: the UE 402 can provide an access point identifier, or other network identifier, to the network gateway 404). In response to the request from the UE 402, the network gateway 404 can validate the UE 402 for the network 406.

In some embodiments, the UE 402 communicates with the network gateway 404 once a network corresponding to the network gateway 404 is detected and without user interaction with the UE 402. In certain embodiments, the UE 402 initiates communication based at least in part on user interaction in which the user requests access to the network 406 and/or data or a computing device that is accessible via the network 406. In some cases, the UE 402 initiates communication based at least in part on a detected network change, as described herein.

Although not illustrated, in some embodiments, in some cases, the UE 402 terminates one or more VPN tunnels that were used by the UE 402 to access one or more network associated with another communication system. For example, the UE 402 can detect a network change, and, in response, can terminate a VPN tunnel. The UE 402 may have been accessing one or more networks (non-limiting example: a private network) associated with the other communication system using one or more VPN tunnels. In addition, the UE 402 may have been using one or more network identifiers associated with one or more networks corresponding to the another communication system. In some embodiments, the UE 402 can delete and/or discontinue the use of the network identifiers associated with one or more networks corresponding to the another communication system. In addition, in some embodiments, the UE 402 can cease communication with a network gateway associated with the other communication system. Alternatively, in some embodiments, the one or more VPN tunnels are terminated automatically or without action from the UE 402 (non-limiting example, one or more VPN tunnels to one or more private networks associated with the other communication system are automatically terminated or lost when the UE 402 moves outside a coverage area of the second communication system). In some embodiments, the one or more VPN tunnels may have been automatically terminated, yet the UE 402 can confirm that the VPN tunnels are terminated prior to establishing any new VPN tunnels.

At (2), the UE 402 receives one or more network parameters from the network gateway 404. In some embodiments, the network parameter includes a network identifier, such as an IP address, APN, and/or other identifier. However, it will be understood that a variety of network parameters can be used and/or sent to the UE 402, such as, but not limited to, a RAT, SSID, PLMN, etc.

Here, the UE 402 can compare the received network parameter with stored network information, such as stored network parameters, to identify the network 406 that is associated with the received network parameter and the network gateway 404. For example, the UE 402 can compare the received network parameter with the various network parameters stored thereon to identify a match. And from the match, the UE 402 can identify the network associated with the received network parameter. Further, the UE 402 can use the received network parameter to determine if the UE 402 is configured to join the network 406 associated with the gateway 404. If the UE 402 is configured to join the network 406, it can join the network (if it has not done so already) and proceed to step 3. If not, the UE 402 can discontinue the process of joining the network 406 or discontinue communications with the gateway 404.

In some embodiments, in addition to comparing network parameters, the UE 404 can also determine or receive location data from the gateway 404. The UE 402 can compare the location data to stored network information (non-limiting examples: stored location information associated with one or more gateways) to determine if the location of the gateway 404 (or its own location) corresponds to a location identified by the stored network information. If the location of the gateway 404 does not correspond to the location data of the stored network information, the UE 402 can discontinue the process of joining the network 406 or discontinue communications with the gateway 404. Accordingly, in some embodiments, location data can be used by the UE 402 to verify that the UE 402 is configured to join a particular network and/or communicate with a particular gateway. Based on a determination that the received network parameter corresponds to a stored network parameter, the UE 402 can identify the network 406 and network information associated with the network 406.

Once the UE 402 has joined the network 406, the UE 402 can (3) use the stored network information associated with the network 406 to communicate with a first PN gateway 422 and establish a first VPN tunnel (non-limiting example: using a VPN client) to the corresponding first PN 424. For example, the network information can include computer-executable applications that initiate establishing the first VPN tunnel to the first PN 424, as well as the various credentials, certificates, identifiers, and passwords to establish the VPN tunnel to the first PN 424. Further, in some cases, using the stored network information and/or a network identifier assigned to the UE 402 by the gateway 404, the UE 402 can access one or more endpoints within the network 406, such as the UE 430 or other endpoints (non-limiting examples: UE, devices, servers, networks, etc., within the network 406).

In some embodiments, the UE 402 can automatically communicate with the first PN gateway 422 based at least in part on receipt of the network parameter and joining the network 406 without any further user interaction with the UE 402. In some embodiments, the UE 402 communicates with the first PN gateway 422 based at least in part on a user initiating an application or other computer-executable instructions, or on the user interacting with the UE 402 to request access to the first PN gateway 422, the network 406, a private network 424, 428 available via the network 406 and/or a computing device 432, 434 available via the network 406. For example, a user may request to communicate with device 434. In some embodiments, the UE 402 or an application on the UE 402 (e.g., a VPN manager) establishes a dynamic layering of authentication software (e.g., VPN clients) that the UE can utilize to direct traffic from one VPN tunnel through another VPN tunnel. For example, the UE 402 can establish a first VPN tunnel using a first VPN client and can establish a second VPN tunnel using a second VPN client. When establishing the second VPN tunnel, the UE 402 can control the second VPN client so that the second VPN client routes its outgoing traffic through the first VPN client. As a result, the second VPN tunnel can be established within the first VPN tunnel (also referred to herein as nesting).

As part of establishing the first VPN tunnel, the UE 402 can provide the first PN gateway 422 with private network information, such as one or more credentials stored on the UE 402 (non-limiting examples: identifiers, certifications, username, password, IKE key type, IKE identify, IKE version requirement, split tunnel definition, suite B encryption settings, phase 1 settings, Diffie-Helman groups supported, or other cryptographic keys, CA certificate information, user certificate information, authentication data, etc.). In some cases, the UE 402 can provide first PN gateway 422 with private network information, such as authentication data (non-limiting examples: a MAC address, SIM card information, serial number, certifications, certificate authority information, user certificate information, username, password, password-derived keys, hashes, salted hashes of unique device properties and/or user passwords, credentials, etc.), in order to establish the first VPN tunnel with the first PN gateway 422. The first PN gateway 422 can use the private network information, such as credentials or authentication data, to authenticate and validate the UE 402 for the first PN 424.

At (4) the UE 402 receives a first PN identifier (e.g., through a VPN tunnel) associated with the first PN 424. In some embodiments, the first PN gateway 422 can provide the UE 402 with a first PN identifier for the first PN 424 based, at least in part, on authenticating the UE 402 for the first PN 424. In some embodiments, the first PN identifier includes an IP address. However, it will be understood that a variety of network identifiers can be used and/or sent to the UE 402. Using the first PN identifier, the UE 402 can access one or more endpoints within the first PN 424, such as the second PN gateway 426 or other endpoints (non-limiting examples: UE, devices, servers, networks, etc., within the PN 124).

At (5), using the first PN identifier from the first PN gateway 422, the UE 402 communicates with a second PN gateway 426 to establish a second VPN tunnel (non-limiting examples: using a second VPN client, using a first and second VPN client) with the second PN gateway 426. In some embodiments, the second VPN tunnel is established within the first VPN tunnel. The second VPN tunnel can be established similar to the first VPN tunnel, in that the UE 402 can provide the second PN gateway 426 with at least a portion of the private network information and the second PN gateway 426 can use the received data to validate the UE 402 for the second PN 428. In some cases, the UE 402 can provide second PN authentication data, as described herein, in order to establish the second VPN tunnel with the second PN gateway 426. In some embodiments, to establish the second VPN tunnel within the first VPN tunnel, the UE 402 can dynamically layer authentication software (e.g., VPN clients) such that one VPN client routes its traffic through another VPN client.

In addition, in some embodiments, the UE 402 can automatically communicate with the second PN gateway 426 based at least in part on receipt of the first PN identifier without any further user interaction with the UE 402. In some embodiments, the UE 402 communicates with the second PN gateway 426 based at least in part on a user initiating an application or other computer-executable instructions or on the user interacting with the UE 402 to request access to the second PN gateway 426, the network 406, a private network 424, 428 available via the network 406 and/or a computing device 432, 434 available via the network 406.

Once validated, or in response to communicating with the UE 402, the second PN gateway 426 can (6) communicate a second PN identifier associated with the second PN 428 to the UE 402. Using the second PN identifier, the UE 402 can communicate with one or more endpoints within the second PN 428. Accordingly, in some embodiments, the UE 402 can maintain at least three network identifiers: a network identifier for communications with endpoints within the network 406, a first PN identifier for communications with endpoints within the first PN 424, and a second PN identifier for communications with endpoints within the second PN 428.

Depending on the embodiment, certain acts, events, blocks, communications or functions identified above can be performed in a different sequence, can be added, merged, or left out altogether (non-limiting example: not all described operations or events are necessary). For example, in some cases, any one or any combination of events (1), (2), (3), (4), (5) or (6) can be omitted. Further, in some embodiments, the UE 402 may not send communications to the network gateway 404 prior to receiving a network parameter from the network gateway 404. For instance, the network gateway 404 can broadcast network parameters at regular intervals, which can be received by any UE located within the coverage area of the network gateway 404. Moreover, in certain embodiments, operations or events can be performed concurrently, e.g., the UE 402 can concurrently establish a first VPN tunnel to the first PN and a second VPN tunnel to the second PN. In some embodiments, the network gateway 404 can provide the UE 402 with a network identifier at the same time that it forwards that UE's 402 identification data to the first PN gateway 422, etc.

Furthermore, any one or any combination of the activities described above can occur automatically and/or without user input. For example, the UE 402 can detect the network gateway 404, establish a VPN tunnel to the PNs 424, 428, access stored network information, and/or shutdown a VPN tunnel to the first PN 424 or the second VPN 428, and/or cease use or delete the PN identifier without user input.

Figure 4B:
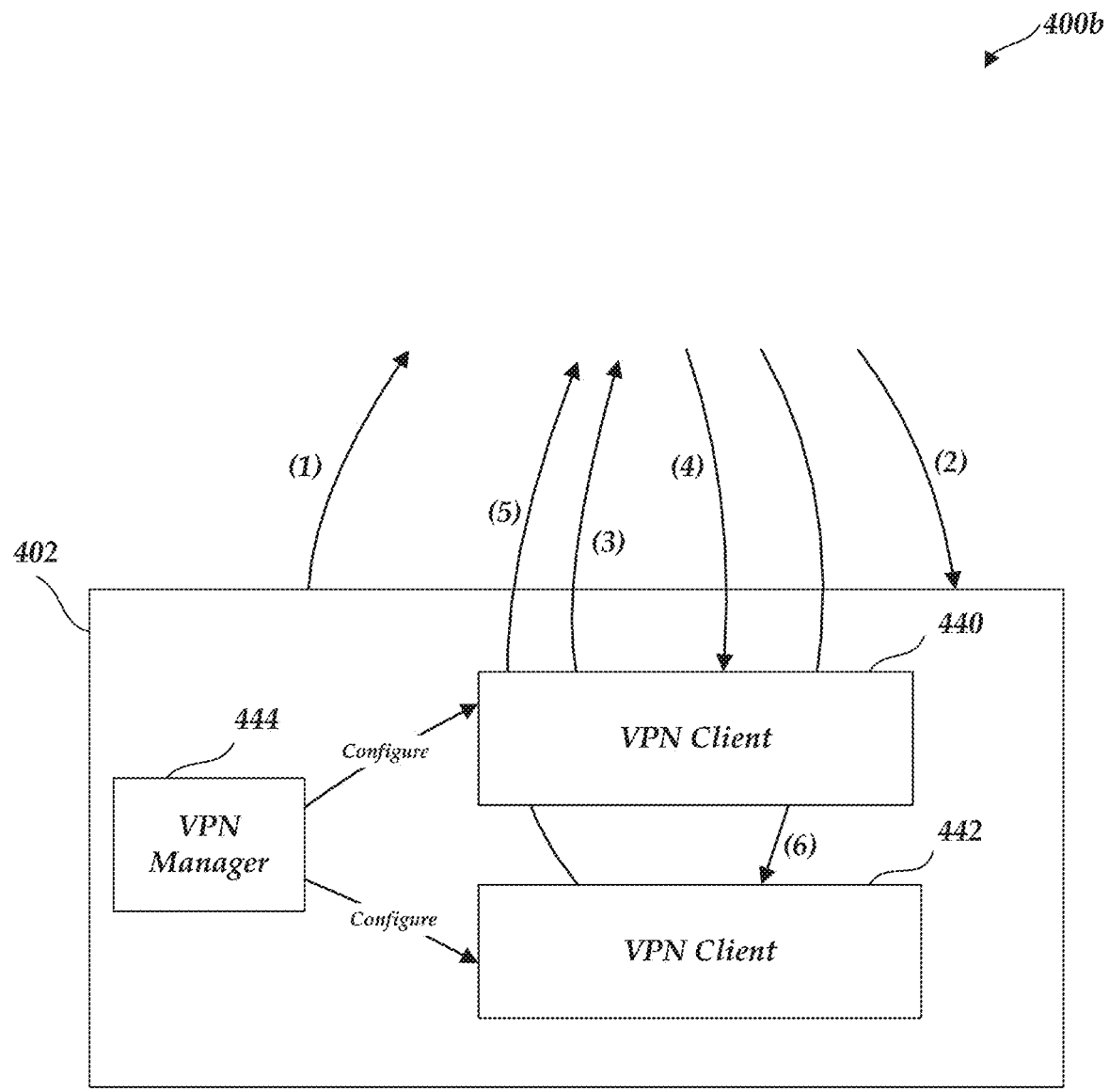
FIG. 4B illustrates an environment that provides additional details regarding the setup of virtual private network (VPN) clients, according to some embodiments.

FIG. 4B illustrates an environment 400b that provides additional details regarding the setup of VPN clients, according to some embodiments. Although the UE 402 of FIG. 4B will be described in the context of the data flow diagram 400 of FIG. 4A, it should be noted that FIG. 4B provides an example of some, but not necessarily all, UE environments and therefore should not be construed as limiting.

As described above with respect to FIG. 4A, at (1), the UE 402 communicates with the network gateway 404 to request access to network 406. At (2), the UE 402 receives one or more network parameters from the network gateway 404. The UE 402 can use the received network parameter to determine if the UE 402 is configured to join the network 406 associated with the gateway 404. If the UE 402 is configured to join the network 406, it can join the network (if it has not done so already) and proceed to step 3.

At (3), once the UE 402 has joined the network 406, the UE 402 can use stored network information associated with the network 406 to communicate with a first PN gateway 422 and establish a first VPN tunnel to the first PN 424. For example, the UE 402 can use a VPN manager 444 to route stored network information associated with the PN 424 to a first VPN client 440. The first VPN client 440 can establish the first VPN tunnel by encrypting and/or encapsulating (e.g., with an IP header containing routing information) the stored network information. The stored network information associated with the PN 424 is then transmitted by the UE 402 through gateway 404, to PN gateway 422. The PN gateway 422 can then decrypt and/or un-encapsulate the data, and authenticate and validate the UE 402 for the first PN 424.

At (4) once the UE 402 is authenticated and validated for the first PN 424, the UE 402 receives a first PN identifier through the first VPN tunnel. For example, the PN gateway 422 transmits the first PN identifier through the first VPN tunnel. The first VPN client can decrypt and un-encapsulate the data.

At (5), once the UE 402 has joined the PN 422, the UE 402 can use stored network information associated with PN 428 to communicate with a second PN gateway 426 and establish a second VPN tunnel to the second PN 428. For example, the UE 402 can use the VPN manager 444 to route the stored network information associated with the PN 428 to the second VPN client 442. The second VPN client 442 can establish a second VPN tunnel by encrypting and encapsulating the stored network information. The UE 402 can then use the VPN manager to direct or control the second VPN client such that it routes its data to the first VPN client 440. As described above in step 3, the first VPN client 440 can further encrypt and encapsulate the stored network information.

The stored network information associated with the PN 428 is then transmitted by the UE 402 through gateway 404 and PN gateway 422, to PN gateway 426. In some instances, the PN gateway 422 can decrypt and un-encapsulate a first layer of decryption and encapsulation associated with the first VPN client, and the PN gateway 426 can decrypt and un-encapsulate a second layer of decryption and encapsulation associated with the second VPN client. The second PN gateway 426 can then authenticate and validate the UE 402 for the second PN 428.

At (6) once the UE 402 is authenticated and validated for the second PN 428, the UE 402 receives a second PN identifier through the first and second VPN tunnels. For example, the PN gateway 426 transmits the second PN identifier to the UE 402, through the first PN gateway 422. As described above, the second PN gateway 426 and the first PN gateway 422 can each add a layer of encryption and encapsulation to the data.

The UE 402 can receive the data with two layers of encryption. The first VPN client 440 can decrypt and un-encapsulate a first layer of data corresponding to the first PN gateway 422. The UE 402, using the VPN manager 444, can then direct or control the first VPN client 440 to route the data to the second VPN client. The second VPN client 442 can decrypt and un-encapsulate a second layer of data corresponding to the second PN gateway 426. The UE 402 can then use the second PN identifier associated with the second PN 428 to communicate with one or more endpoints within the second PN 428.

Once the VPN tunnels are established, the VPN client 442 can route all outgoing traffic through VPN client 440. Similarly, all inbound traffic can be first routed through VPN client 440 and then through VPN client 442. In this way, outbound traffic can be dual encrypted layered and dual encrypted and layered inbound traffic can be correctly processed in order to access the underlying data.

In some embodiments, the VPN manager 444 controls a plurality of VPN clients including the first VPN client 440 and the second VPN client 442. For example, the VPN manager 444 can shuffle the order to the VPN clients such that nested VPN tunnels can be established in various orders. For example, the VPN manager 444 can route the data from the first or second VPN client 440, 442 such that the first VPN tunnel is nested with the second VPN tunnel or the second VPN tunnel is nested with the first VPN tunnel. In some embodiments, one or more of the VPN clients have different and distinct cryptographic stacks and key stores.

Flow Diagrams

Figure 5:
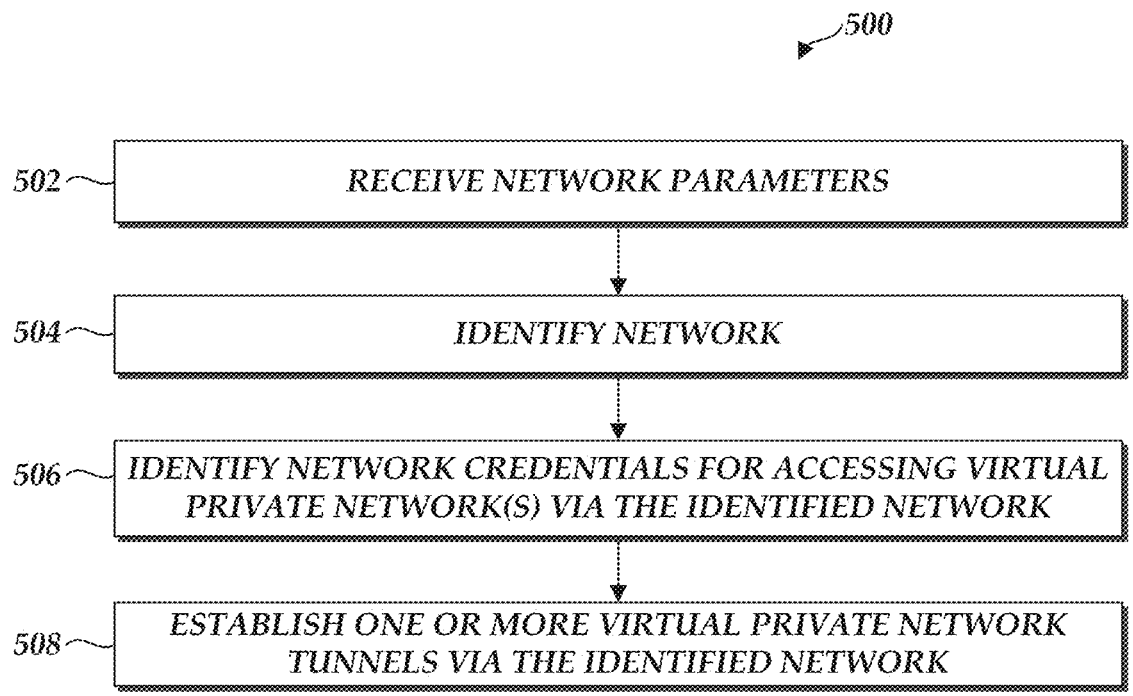
FIG. 5 is a flow diagram illustrative of an embodiment of a routine implemented by a user equipment (UE) for establishing one or more virtual private network tunnels.

FIG. 5 is a flow diagram illustrative of an embodiment of a routine implemented by a UE for establishing one or more virtual private network tunnels within a network. One skilled in the relevant art will appreciate that the elements outlined for routine 500 may be implemented by one or many computing devices/components, such as the UE, an communication system or one of its components, another computing device, etc. Accordingly, routine 500 has been logically associated as being generally performed by the UE, and thus the following illustrative embodiments should not be construed as limiting.

At block 502, the UE receives network parameters from a network gateway. In some cases, the network parameters can be included in broadcast messages, such as master information blocks or system information blocks, broadcast from a communication system or network gateway, or be included as part of the UE joining a particular network. In some embodiments, the network parameters can include one or more IP addresses, access point identifiers, APNs, network names, network identifiers, SSIDs, session IDs, RATs, PLMN IDs, radio access component or eNodeB identifiers, device identifiers, device names, or other network parameters that are associated with a particular network.

At block 504, the UE identifies a network associated with the received network parameter(s). In some embodiments, the UE can store network information, such as stored network parameters, corresponding to a plurality of networks or private networks to which the UE can join. The UE can use the stored network information to identify the network associated with the received network parameter(s) and/or determine whether the UE is configured to join the network associated with the received network parameter by comparing the stored network information (non-limiting example: stored network parameters) to the received network parameter. For example, the UE can determine that it is configured to join a particular network, and identify the particular network, based on a determination that the received network parameter corresponds to or matches a stored network parameter. Example network parameters include, but are not limited to IP address, APN, SSID, RAT, PLMN, point-of-presence, etc.

In certain embodiments, the UE can identify the network based on one or more IP addresses or a change in IP address. For example, the UE can compare a received IP address with a group of IP addresses stored on the UE as network information and associated with different networks or gateway. Based on the comparison and identifying a matching IP address from the group of stored IP addresses, the UE can identify the networks or gateways that correspond to the received IP address.

In certain embodiments, the UE can identify the network based on an APN or a change in APN. For example, the UE can compare a received APN with a group of APN stored on the UE as network information and associated with different networks or gateway. Based on the comparison and identifying a matching APN from the group of stored APNs, the UE can identify the networks or gateways that correspond to the received APN.

In certain embodiments, the UE can identify the network based on a SSID or a change in SSID. For example, the UE can compare a received SSID with a group of SSID stored on the UE as network information and associated with different networks or gateway. Based on the comparison and identifying a matching SSID from the group of stored SSIDs, the UE can identify the networks or gateways that correspond to the received SSID.

In certain embodiments, the UE can identify the network based on a RAT or a change in RAT. For example, the UE can compare a received RAT with a group of RATs stored on the UE as network information and associated with different networks or gateway. Based on the comparison and identifying a matching RAT from the group of stored RATs, the UE can identify the networks or gateways that correspond to the received RAT In certain embodiments, the UE can identify the network based on a PLMN or a change in PLMN. For example, the UE can compare a received PLMN with a group of PLMNs stored on the UE as network information and associated with different networks or gateway. Based on the comparison and identifying a matching PLMN from the group of stored PLMNs, the UE can identify the networks or gateways that correspond to the received PLMN.

In certain embodiments, the UE can identify the network based on a point-of-presence or a change in point-of-presence. For example, the UE can compare a received point-of-presence with a group of points of presence stored on the UE as network information and associated with different networks or gateway. Based on the comparison, the UE can identify the networks or gateways that correspond to the received point-of-presence.

In certain embodiments, the UE can identify the network based on one or more received network parameters or a change in network parameters. For example, the UE can compare a received network parameter with a group of network parameters stored on the UE as network information and associated with different networks or gateway. Based on the comparison, the UE can identify the networks or gateways that correspond to the received network parameter.

In certain embodiments, the UE can identify the network based on a change in session ID. For example, the UE can compare a received session ID with a group of session IDs stored on the UE as network information and associated with different networks or gateway. Based on the comparison, the UE can identify the networks or gateways that correspond to the received session ID.

In some embodiments, the UE can use multiple network parameters to identify a network. For instance, the UE can include or can receive geographic information (non-limiting examples: spatial or geographic data) that includes, for example, an actual or expected location of the UE, one or more communication systems, associated coverage areas, etc. The UE can compare its location at the time that it received the network parameter with an expected geographic area. The expected geographic area can be based on the expected location of the UE, the expected location of the communication system associated with the network parameter, or the expected location of the coverage area associated with the communication system. If, for example, the UE determines that it is outside of the expected geographic area, the UE can provide an error message indicating that it is not in the appropriate geographic area. If the UE determines that the UE is within the expected geographic area, the UE can proceed to use one or more other network parameters to identify the network. In some embodiments, the UE can determine it is moving such that it will eventually exit or enter a specific coverage area corresponding to a specific network. In some embodiments, the UE can identify the specific network that it will enter.

At block 506, the UE identifies private network information or endpoint information such as private network credentials for accessing one or more virtual private networks via the identified network. For example, the UE stores private network information of private networks that are accessible via different networks. Accordingly, based on the identity of the identified network, the UE can identify the private network which it can join via the identified network. In addition, as discussed in greater detail above, the private network information can include, but is not limited to, data and/or programs used by the UE to access one or more private networks accessible via the identified network and/or one or more devices accessible via the identified network or private networks.

In some embodiments, the UE communicates with the identified network gateway once the identified network is identified and without user interaction with the UE. In certain embodiments, the UE initiates communication based at least in part on user interaction in which the user requests access to the identified destination network and/or data or a computing device that is accessible via the identified destination network. In some cases, the UE initiates communication based at least in part on a detected network change, as described herein.

At block 508, the UE establishes at least one VPN tunnel via the identified network. In certain cases, the UE uses a network identifier received as part of joining the identified network to communicate with at least one PN gateway and establish at least one VPN tunnel. In some embodiments, the UE can automatically communicate with the PN gateway based at least in part on receipt of the network identifier without any further user interaction with the UE. In some embodiments, the UE communicates with the PN gateway based at least in part on a user initiating an application or other computer-executable instructions or on the user interacting with the UE to request access to the PN gateway, the identified network, and/or a computing device available via the identified network.

As part of establishing a VPN tunnel, the UE can provide the PN gateway with private network information, such as private network credentials (non-limiting examples: identifiers, certifications, username, password, IKE key type, IKE identify, IKE version requirement, split tunnel definition, suite B encryption settings, phase 1 settings, Diffie-Helman groups supported, or other cryptographic keys, CA certificate information, user certificate information, authentication data, etc.) and/or stored authentication data (non-limiting examples: a MAC address, SIM card information, serial number, certifications, certificate authority information, user certificate information, username, password, password-derived keys, hashes, salted hashes of unique device properties and/or user passwords, credentials, etc.) in order to establish the VPN tunnel with the PN gateway. The PN gateway can use the private network credentials or authentication data to authenticate and validate the UE for the PN.

In some embodiments, as part of establishing the one or more VPN tunnels, the UE receives a PN identifier associated with a PN. In some embodiments, a PN gateway provides the UE with a PN identifier for the PN based, at least in part, on authenticating the UE for the PN. In some embodiments, the PN identifier includes an IP address. However, it will be understood that a variety of network identifiers can be used and/or sent to the UE. Using the PN identifier, the UE can access one or more endpoints within the PN, such as a second PN gateway or other endpoints (non-limiting examples: UE, devices, servers, networks, etc., within the PN).

In some embodiments, the UE establishes another VPN tunnel associated with another PN using the PN identifier. For example, the UE can use the PN identifier to communicate with a second PN gateway to establish a second VPN tunnel. The UE can establish the second VPN tunnel similar to the manner in which the UE establishes the first VPN tunnel. In addition or alternatively, the UE can establish a nested VPN tunnel, as described herein.

Depending on the embodiment, certain acts, events, blocks, or functions of any of the routine 500 can be performed in a different sequence, can be added, merged, or left out altogether (non-limiting example: not all described operations or events are necessary for the practice of the routine 500). In certain embodiments, operations or events can be performed concurrently, e.g., through multi-threaded processing, interrupt processing, or multiple processors or processor cores or on other parallel architectures, rather than sequentially.

As a non-limiting example, the routine 500 can include joining the identified or destination network. In some embodiments, the UE can join the destination network prior to or after receiving the network parameters. As mentioned previously, in some cases, the UE can use the received network parameters to join the destination network, and in certain embodiments, the UE receives the network parameters upon joining the destination network. Further, in certain cases, the UE joins the destination network prior to, concurrently with, or after identifying the destination network and/or identifying the private network information or endpoint information.

As yet another non-limiting example, the routine 500 can include terminating one or more VPN tunnels to one or more private networks associated with a communication system. For example, the UE can delete and/or discontinue the use of network identifiers associated with one or more private networks associated with the communication system. In addition, in some embodiments, the UE can cease communication with a network gateway associated with the communication system. Alternatively, in some embodiments, one or more VPN tunnels are terminated automatically or without action from the UE (non-limiting example, one or more VPN tunnels to one or more private networks associated with a second MCN system are automatically terminated or lost when the UE moves outside a coverage area of the second MCN system). In some embodiments, the one or more VPN may be automatically terminated, yet the UE confirms that the VPN tunnels are terminated prior to establishing a new VPN tunnel.

Figure 6:
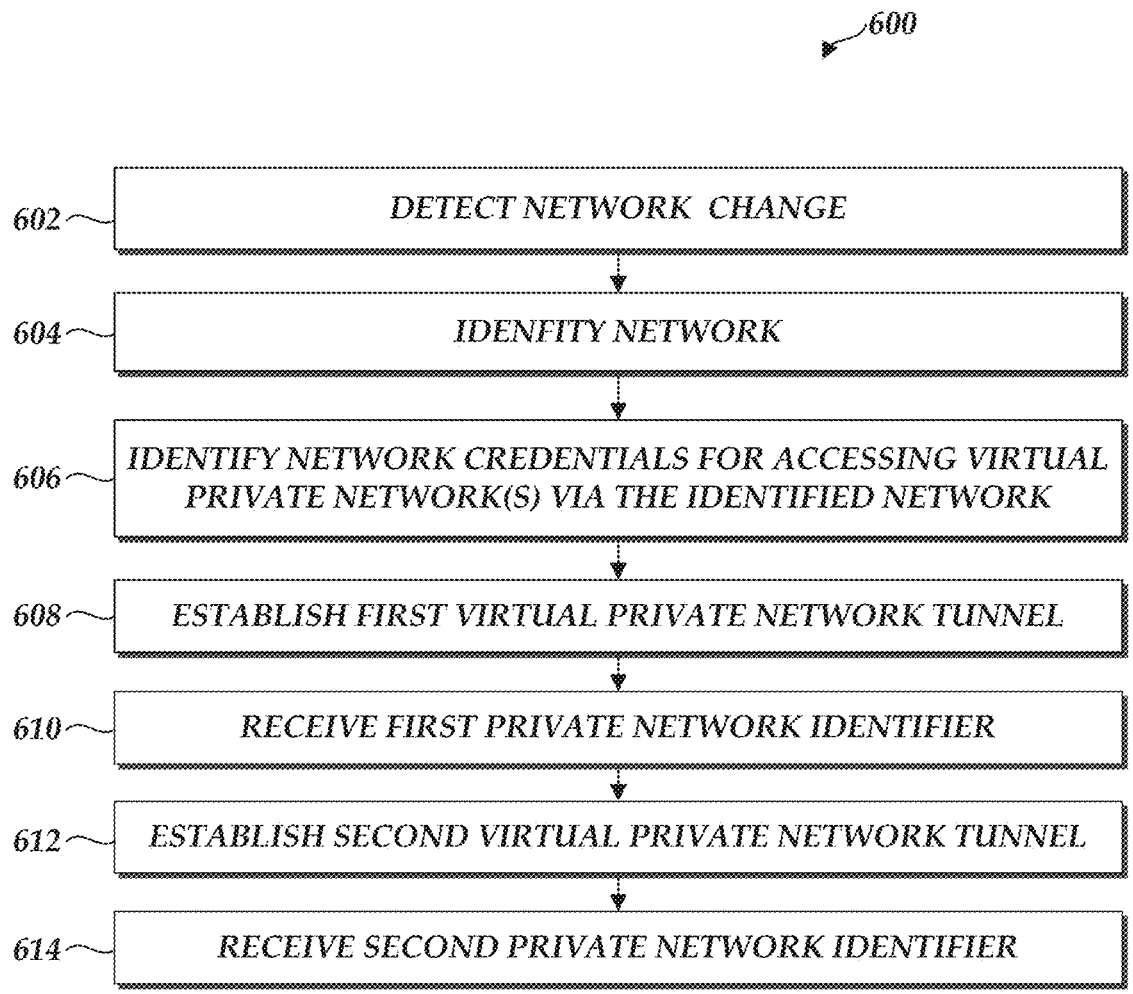
FIG. 6 is a flow diagram illustrative of an embodiment of a routine implemented by a UE for establishing one or more virtual private network tunnels.

FIG. 6 is a flow diagram illustrative of an embodiment of a routine 600 implemented by a UE for establishing one or more virtual private network tunnels within a network. One skilled in the relevant art will appreciate that the elements outlined for routine 600 may be implemented by one or many computing devices/components, such as the UE, an communication system or one of its components, another computing device, etc. Accordingly, routine 600 has been logically associated as being generally performed by the UE, and thus the following illustrative embodiments should not be construed as limiting.

At block 602, the UE detects a network change as described herein. In some embodiments, a network change can include a receipt of network parameters. In some embodiments, the UE may detect a change of IP address of the wireless mobile communication device, a change in point-of-presence of the wireless mobile communication device, a change of IP address of another network gateway, a change in APN, a change in network identifier, a change in SSID, a change in session ID, a change in RAT, a change in PLMN, a loss of signal to another network, a gain of signal to another network. In addition or alternatively, a user may trigger a network change (non-limiting examples: user initiating an application or other computer-executable instructions, user requesting a new network, etc.). For example, a user provides input to the UE, requesting the UE change networks.

At blocks 604 and 606, the UE identifies a network and identifies private network information for accessing one or more VPNs via the identified network, respectively, similar to what is described herein with reference to blocks 504, 506 of FIG. 5. As mentioned herein, the private network information can be stored on the UE and the UE can access the private network information from memory.

At block 610, the UE communicates with a first PN gateway to establish a first VPN tunnel to a corresponding first PN. In some embodiments, the UE can automatically communicate with the first PN gateway based at least in part on receipt of a network identifier without any further user interaction with the UE. In some embodiments, the UE communicates with the first PN gateway based at least in part on a user initiating an application or other computer-executable instructions or on the user interacting with the UE to request access to the first PN gateway, the identified network, and/or a computing device available via the identified network.

As part of establishing the first VPN tunnel, the UE can provide the first PN gateway with identified private network information such as private network credentials and/or authentication data, described previously, in order to establish the first VPN tunnel with the first PN gateway. The first PN gateway can use the private network information to authenticate and validate the UE for the first PN.

At block 612, the UE 402 receives a first PN identifier associated with the first PN. In some embodiments, the first PN gateway provides the UE with a first PN identifier for the first PN based, at least in part, on authenticating the UE for the first PN. In some embodiments, the first PN identifier includes an IP address. However, it will be understood that a variety of network identifiers can be used and/or sent to the UE. Using the first PN identifier, the UE can access one or more endpoints within the first PN, such as a second PN gateway or other endpoints (non-limiting examples: UE, devices, servers, networks, etc., within the first PN). The first PN identifier can be the same type of identifier as the first network identifier or different. Using the first PN identifier, the UE can access the various endpoints within the first PN.

At block 614, the UE communicates with a second PN gateway to establish a second VPN tunnel to a second PN associated with the identified network. For example, using at least the first PN identifier, the UE can communicate with the second PN gateway to establish the second VPN tunnel to the second PN. As described previously, the UE can establish the second VPN tunnel by providing the second PN gateway with one or more credentials, identifiers, certifications, etc. The second PN gateway can use the data to authenticate and validate the UE for the second PN.

At bock 616, once the second PN gateway authenticates or validates the UE for the second PN, the second PN gateway can provide the UE with (and the UE can receive) a second PN identifier. The second PN identifier can be the same type of identifier as the first network identifier, the first PN identifier, or different. Using the second PN identifier, the UE can access the various endpoints within the second PN.

Depending on the embodiment, certain acts, events, blocks, or functions of any of the routine 600 can be performed in a different sequence, can be added, merged, or left out altogether (non-limiting example: not all described operations or events are necessary for the practice of the routine 600). In certain embodiments, operations or events can be performed concurrently, e.g., through multi-threaded processing, interrupt processing, or multiple processors or processor cores or on other parallel architectures, rather than sequentially. For example, as described in greater detail with reference to routine 500, routine 600 can further include joining a destination network and/or terminating one or more VPN tunnels associated with a source network.

Terminology

Although generally described above as being related to communication systems, it will be understood that the backhaul access component can be implemented as a stand-alone device and can communicate with an communication system and/or a component of a network to control access to the backhaul. For example, the backhaul access component can be configured to communicate with a base station or a core component of a cellular network, such as, but not limited to, a component of the evolved packet core (EPC) of a long-term evolution (LTE) system, etc., or other type of wireless network. In such embodiments, the backhaul access component can cause the corresponding component to perform some or all of the functions described herein with respect to the communication system.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Virtualization technologies allow a single physical computing device to host one or more instances of a virtual machine, which virtual machine instance appears to a user as an independent computing device. With virtualization, the host computing device can create, maintain, delete, or otherwise manage virtual machines instances in a dynamic manner. In turn, users can request computing resources, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A wireless mobile communication device, comprising:
a processor in communication with one or more non-transitory computer-readable media comprising computer-executable instructions that when executed by the processor, causes the processor to:
identify an available network;
establish a connection with the available network based at least in part on a determination that the wireless mobile communication device is configured to join the available network;
cause a first virtual private network (VPN) client to establish a first VPN tunnel to a first private network based at least in part on a first network identifier associated with the available network and first private network credentials; and
cause a second VPN client to establish a second VPN tunnel to a second private network such that the second VPN client routes its outgoing traffic through the first VPN client, wherein the second VPN client establishes the second VPN tunnel based at least in part on a first private network identifier associated with the first private network and second private network credentials.

2. The wireless mobile communication device of claim 1, wherein the processor is further configured to determine that the wireless mobile communication device is configured to join the available network based at least in part on network information that is stored on the wireless mobile communication device.

3. The wireless mobile communication device of claim 1, wherein the processor is further configured to identify private network information that is stored on the wireless mobile communication device, wherein the private network information comprises the first private network credentials and the second private network credentials.

4. The wireless mobile communication device of claim 3, wherein the private network information is associated with the available network.

5. The wireless mobile communication device of claim 1, wherein the first private network credentials enable the wireless mobile communication device to access the first private network.

6. The wireless mobile communication device of claim 1, wherein the second VPN tunnel is nested within the first VPN tunnel, and wherein the second VPN client is different from the first VPN client.

7. The wireless mobile communication device of claim 1, wherein the processor is further configured to search for the available network based on a network change, wherein the network change is indicative of at least one of a change of IP address of the wireless mobile communication device, a change in point-of-presence of the wireless mobile communication device, a change of IP address of a network gateway with which the wireless mobile communication device communicates, a change in access point name, a change in service set identifier, a change in session ID, a change in radio access technology, a change in public land mobile network, a loss of signal to another network, or a gain of signal to another network.

8. The wireless mobile communication device of claim 1, wherein the processor is further configured to cause a third VPN client to establish a third VPN tunnel to a third private network such that the third VPN client routes its outgoing traffic through the second VPN client, wherein the third VPN client establishes the third VPN tunnel based at least in part on a second private network identifier associated with the second private network and third private network credentials.

9. The wireless mobile communication device of claim 1, wherein the available network is a movable cellular network, wherein a movable cellular network communication system independently provides the movable cellular network without communication to another communication system.

10. A method comprising:
identifying an available network;
establishing a connection with the available network based at least in part on a determination that a wireless mobile communication device is configured to join the available network;
causing a first virtual private network (VPN) client to establish a first VPN tunnel to a first private network based at least in part on a first network identifier associated with the available network and first private network credentials; and
causing a second VPN client to establish a second VPN tunnel to a second private network such that the second VPN client routes its outgoing traffic through the first VPN client, wherein the second VPN client establishes the second VPN tunnel based at least in part on a first private network identifier associated with the first private network and second private network credentials.

11. The method of claim 10, further comprising identifying private network information that is stored on the wireless mobile communication device, wherein the private network information comprises the first private network credentials and the second private network credentials.

12. The method of claim 10, wherein the first private network credentials enable the wireless mobile communication device to access the first private network.

13. The method of claim 10, wherein the second VPN tunnel is nested within the first VPN tunnel, and wherein the second VPN client is different from the first VPN client.

14. The method of claim 10, further comprising causing a third VPN client to establish a third VPN tunnel to a third private network such that the third VPN client routes its outgoing traffic through the second VPN client, wherein the third VPN client establishes the third VPN tunnel based at least in part on a second private network identifier associated with the second private network and third private network credentials.

15. The method of claim 10, wherein the available network is a movable cellular network, wherein a movable cellular network communication system independently provides the movable cellular network without communication to another communication system.

16. A computer-readable, non-transitory storage medium storing computer-executable instructions that when executed by a processor cause the processor to:
identify an available network;

establish a connection with the available network based at least in part on a determination that a wireless mobile communication device is configured to join the available network;

cause a first virtual private network (VPN) client to establish a first VPN tunnel to a first private network based at least in part on a first network identifier associated with the available network and first private network credentials; and cause a second VPN client to establish a second VPN tunnel to a second private network such that the second VPN client routes its outgoing traffic through the first VPN client, wherein the second VPN client establishes the second VPN tunnel based at least in part on a first private network identifier associated with the first private network and second private network credentials.

17. The computer-readable, non-transitory storage medium of claim 16, wherein the computer-executable instructions further cause the processor to determine that the wireless mobile communication device is configured to join the available network based at least in part on network information that is stored on the wireless mobile communication device.

18. The computer-readable, non-transitory storage medium of claim 16, wherein the computer-executable instructions further cause the processor to identify private network information that is stored on the wireless mobile communication device, wherein the private network information comprises the first private network credentials and the second private network credentials.

19. The computer-readable, non-transitory storage medium of claim 16, wherein the first private network credentials enable the wireless mobile communication device to access the first private network.

20. The computer-readable, non-transitory storage medium of claim 16, wherein the second VPN tunnel is nested within the first VPN tunnel, and wherein the second VPN client is different from the first VPN client.

\* \* \* \* \*